(12) United States Patent
Stapleton et al.

(10) Patent No.: US 9,723,612 B2
(45) Date of Patent: Aug. 1, 2017

(54) FREQUENCY TRANSLATION IN A VIRTUALIZED DISTRIBUTED ANTENNA SYSTEM

(71) Applicant: DALI SYSTEMS CO. LTD., George Town, Grand Cayman (KY)

(72) Inventors: Shawn Patrick Stapleton, Burnaby (CA); Daryl Meerkeerk, Burnaby (CA)

(73) Assignee: Dali Systems Co. Ltd., George Town (KY)

(*) Notice: Subject to any disclaimer, the term of this patent is extended or adjusted under 35 U.S.C. 154(b) by 0 days.

(21) Appl. No.: 13/753,288

(22) Filed: Jan. 29, 2013

(65) Prior Publication Data

US 2014/0036770 A1 Feb. 6, 2014

Related U.S. Application Data

(60) Provisional application No. 61/592,190, filed on Jan. 30, 2012.

(51) Int. Cl.
| | | |
|---|---|---|
| *H04W 72/04* | (2009.01) | |
| *H04W 36/06* | (2009.01) | |
| *H04B 7/155* | (2006.01) | |
| *H04W 88/08* | (2009.01) | |
| *H04B 7/022* | (2017.01) | |

(52) U.S. Cl.
CPC .... *H04W 72/0453* (2013.01); *H04B 7/15514* (2013.01); *H04B 7/15542* (2013.01); *H04W 36/06* (2013.01); *H04B 7/022* (2013.01); *H04W 88/085* (2013.01)

(58) Field of Classification Search
CPC . H04W 72/0453; H04W 36/06; H04W 16/14; H04W 84/12

USPC .................................. 370/328, 329, 252, 338
See application file for complete search history.

(56) References Cited

U.S. PATENT DOCUMENTS

| 7,286,507 | B1* | 10/2007 | Oh et al. ..................... 370/334 |
| 8,391,803 | B2* | 3/2013 | Banin .................... H03B 19/00 |
| | | | 331/2 |
| 2005/0256963 | A1* | 11/2005 | Proctor, Jr. et al. .......... 709/230 |
| 2005/0286448 | A1* | 12/2005 | Proctor et al. ............... 370/279 |

(Continued)

FOREIGN PATENT DOCUMENTS

WO  WO 2013/116229 A1  8/2013

OTHER PUBLICATIONS

Notification of Transmittal of the International Search Report and the Written Opinion of the International Searching Authority, or the Declaration and International Search Report and Written Opinion of the International Searching Authority for International Application No. PCT/US2013/023661 mailed on Apr. 15, 2013, 11 pages.

(Continued)

*Primary Examiner* — Jamal Javaid
(74) *Attorney, Agent, or Firm* — Kilpatrick Townsend & Stockton LLP

(57) ABSTRACT

A method for communicating with wireless user devices includes receiving a signal at a DAU, the signal residing within a first frequency band and processing the signal at the DAU. The method also includes transmitting the processed signal from the DAU and receiving the transmitted signal at a DRU. The method further includes converting the signal to a second frequency band different than the first frequency band.

25 Claims, 14 Drawing Sheets

(56) References Cited

U.S. PATENT DOCUMENTS

2009/0191891 A1    7/2009  Ma et al.
2010/0035600 A1    2/2010  Hou et al.
2010/0061291 A1*  3/2010  Wala .............................. 370/312

OTHER PUBLICATIONS

Axell, "*Frequency Shifting Repeaters*", Axell Wireless, Feb. 21, 2011. Retrieved from the Internet. Retrieved on [Mar. 20, 2013]. URL: http://ns.rktelecom/ru/_photos/23/357.pdf, 5 pages.

* cited by examiner

FREQUENCY TRANSLATION IN A VIRTUALIZED DISTRIBUTED ANTENNA SYSTEM

CROSS-REFERENCES TO RELATED APPLICATIONS

This application claims priority to U.S. Provisional Patent Application No. 61/592,190, filed on Jan. 30, 2012, entitled "Frequency Translation in a Virtualized Distributed Antenna System," the disclosure of which is hereby incorporated by reference in its entirety for all purposes.

BACKGROUND OF THE INVENTION

Wireless communication systems employing Distributed Antenna Systems (DAS) are available. A DAS typically includes one or more host units, optical fiber cable or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable.

A DAS is advantageous from a signal strength and throughput perspective because its remote antenna units are physically close to wireless subscribers. The benefits of a DAS include reducing average downlink transmit power and reducing average uplink transmit power, as well as enhancing quality of service and data throughput.

Despite the progress made in wireless communications systems, a need exists for improved methods and systems related to wireless communications.

SUMMARY OF THE INVENTION

Embodiments of the present invention relate to communication networks. More particularly, embodiments of the present invention provide methods and systems related to the provision and operation of virtual distributed antenna systems (DASs). Merely by way of example, the present invention has been applied to DASs utilizing software configurable radio (SCR). The methods and systems described herein are applicable to a variety of communications systems including systems utilizing various communications standards.

Embodiments of the present invention relate to an interacting with frequency-restricted Base Transceiver Stations (BTS) and to a non-reciprocal series of frequency translations. Factors such as user devices, geographical locations, and frequency regulations may influence an operator's decision as to which frequencies to transmit at particular locations. In some instances, the operator may own one or more BTSs that are limited in terms of frequencies that the BTS may transmit and receive. Traditionally, an operator may then be forced to either purchase new BTS equipment (e.g., new transceiver cards) or confine the associated network to frequency bands supported by the existing BTS equipment. Embodiments provided herein allow a BTS to operate within a first frequency range and antenna in communication with the BTS to operate within a different second frequency range. For example, signals (e.g., uplink-carrier signals and/or beacons) may be transmitted from the BTS within a RF base-station frequency band, they may then be translated into a baseband frequency band as the signals are carried towards a digital remote unit (DRU), and an antenna at the DRU may translate the baseband signals to one or more RF field frequency bands different from the base-station frequency band. A converse process may occur to translate signals received at the DRU transmitted to the BTS. Thus, an operator may be able to dynamically control frequency bands associated with particular DRUs (and with particular geographic areas) even if the BTS is unable to adjust its transmission and receive frequency bands. Further, these translations may be applied to a select set of signals associated with the DRU (e.g., some or all beacon signals). Thus, it may be possible to transmit, e.g., beacons from a DRU-associated antenna within a plurality of frequency bands, even if an associated BTS is not configured to emit the signals within all of the bands.

According to an embodiment of the present invention, a system for communicating with wireless user devices is provided. The system includes a base transceiver station (BTS) comprising at least one sector. Each sector is configured to transmit radio-frequency (RF) signals within one or more first frequency bands. The system also includes a Digital Access Unit (DAU) coupled to the BTS and configured to receive at least some of the RF signals output by the base transceiver station and process the at least some of the RF signals. The DAU is also configured to transmit the processed signals. The system further includes at least one Digital Remote Unite (DRU) configured to receive the processed signals and translate at least one of the processed signals to one or more second frequency bands different than the one or more first frequency bands.

According to another embodiment of the present invention, a method for communicating with wireless user devices is provided. The method includes receiving a signal at a DAU, the signal residing within a first frequency band and processing the signal at the DAU. The method also includes transmitting the processed signal from the DAU, receiving the transmitted signal at a DRU, and converting the signal to a second frequency band different than the first frequency band.

According to a specific embodiment of the present invention, a method for communicating with wireless user devices is provided. The method includes receiving a plurality of beacon signals, each of the beacon signals having originated at a BTS and having been transmitted by the BTS within one or more first frequency bands and translating each of the plurality of beacon signals. The translated signals are within one or more second frequency bands, the one or more first frequency bands are different than the one or more second frequency bands, the one or more first frequency bands comprise an RF frequency, and the one or more second frequency bands comprise an RF frequency.

According to another specific embodiment of the present invention, a system for communicating with wireless user devices is provided. The system includes a Digital Access Unit (DAU) operable to receive at least one RF signal from a base station. The at least one RF signal is associated with a first frequency band and the DAU includes an RF input, a first mixer coupled to the RF input, and an oscillator coupled to the first mixer and operable to convert signals in the first frequency band to an intermediate frequency. The DAU also includes an A/D converter coupled to the mixer and a first FPGA coupled to the A/D converter. The system also includes a Digital Remote Unit (DRU) coupled to the DAU. The DRU includes a second FPGA, a D/A converter coupled to the second FPGA, and a second mixer coupled to the D/A converter and operable to convert signals at the intermediate frequency to a second frequency band different from the first frequency band. The DRU also includes an RF output coupled to the second mixer. The system further includes an antenna coupled to the DRU.

According to an alternative embodiment of the present invention, a system for communicating with wireless user devices is provided. The system can include a base transceiver station (BTS) including at least one sector. Each sector is configured to transmit radio-frequency (RF) signals within one or more first frequency bands. The system also includes a Digital Access Unit (DAU) coupled to the BTS and configured to receive at least some of the RF signals output by the base transceiver station, process the at least some of the RF signals, and transmit the processed signals. The system further includes at least one Digital Remote Unit (DRU) configured to receive the processed signals and translate at least one of the processed signals to one or more second frequency bands. The one or more second frequency bands are different than the one or more first frequency bands.

According to another alternative embodiment of the present invention, a method for communicating with wireless user devices is provided. The method includes receiving an input from an operator identifying a field frequency band. The method further includes virtually configuring a DRU to convert signals to the field frequency band.

According to yet another alternative embodiment of the present invention, a method for communicating with wireless user devices is provided. The method includes receiving a signal at a DAU. The signal resides within a first frequency band. The method further includes processing the signal at the DAU. The method also includes transmitting the processed signal from the DAU. The method further includes receiving the transmitted signal at a DRU. The method further includes converting the signal to a second frequency band. The second frequency band is different than the first frequency band.

According to a particular embodiment of the present invention, a method for communicating with wireless user devices is provided. The method includes receiving a plurality of beacon signals. Each of the -beacon signals originated at a BTS. Each of the –beacon signals was transmitted by the BTS within one or more first frequency bands. The method further includes translating each of the plurality of –beacon signals. The translated signals are within one or more second frequency bands. The one or more first frequency bands are different than the one or more second frequency bands. The one or more first frequency bands comprise an RF frequency. The one or more second frequency bands comprise an RF frequency.

Numerous benefits are achieved by way of the present invention over conventional techniques. For instance, embodiments of the present invention allow a network to effectively adapt to frequency demands placed on the network. For example, frequency bands associated with a particular DRU may be altered or expanded in response to, e.g., new types of devices accessing the DRU, new frequency regulations, new frequency use at geographical locations surrounding a location associated with the DRU, a relocation of the DRU, new BTS provisioning of the DRU, and the like. Further, the alteration or expansion may be accomplished without physically altering the network (e.g., replacing BTS equipment, installing new DRU equipment, etc.). Thus, an operator may easily and quickly adjust a frequency footprint of a network and efficiently respond to network demands.

These and other embodiments of the invention along with many of its advantages and features are described in more detail in conjunction with the text below and attached figures.

DETAILED DESCRIPTION OF SPECIFIC EMBODIMENTS

Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access. One of the challenges faced by network operators is caused by the cost incurred of upgrading Base Transceiver Stations (BTS) or reconfiguring the geographical frequency plan of the network operators, such that frequency bands available to network users may be adjusted. Specifically, some BTS equipment is only able to transmit and receive signals within, e.g., one or a small number of frequency bands. Meanwhile, an operator may wish to subsequently transmit and receive signals, via antennas coupled to the BTS equipment, at different frequencies. A Distributed Antenna System (DAS) can make efficient use of the frequency-restricted hardware and can provide flexibility in repositioning the carrier frequencies and beacons of the infrastructure hardware. Applications of embodiments of the present invention may be suitable to be employed with distributed base stations, distributed antenna systems, distributed repeaters, mobile equipment and wireless terminals, portable wireless devices, and/or other wireless communication systems such as microwave and satellite communications.

Figure 1:
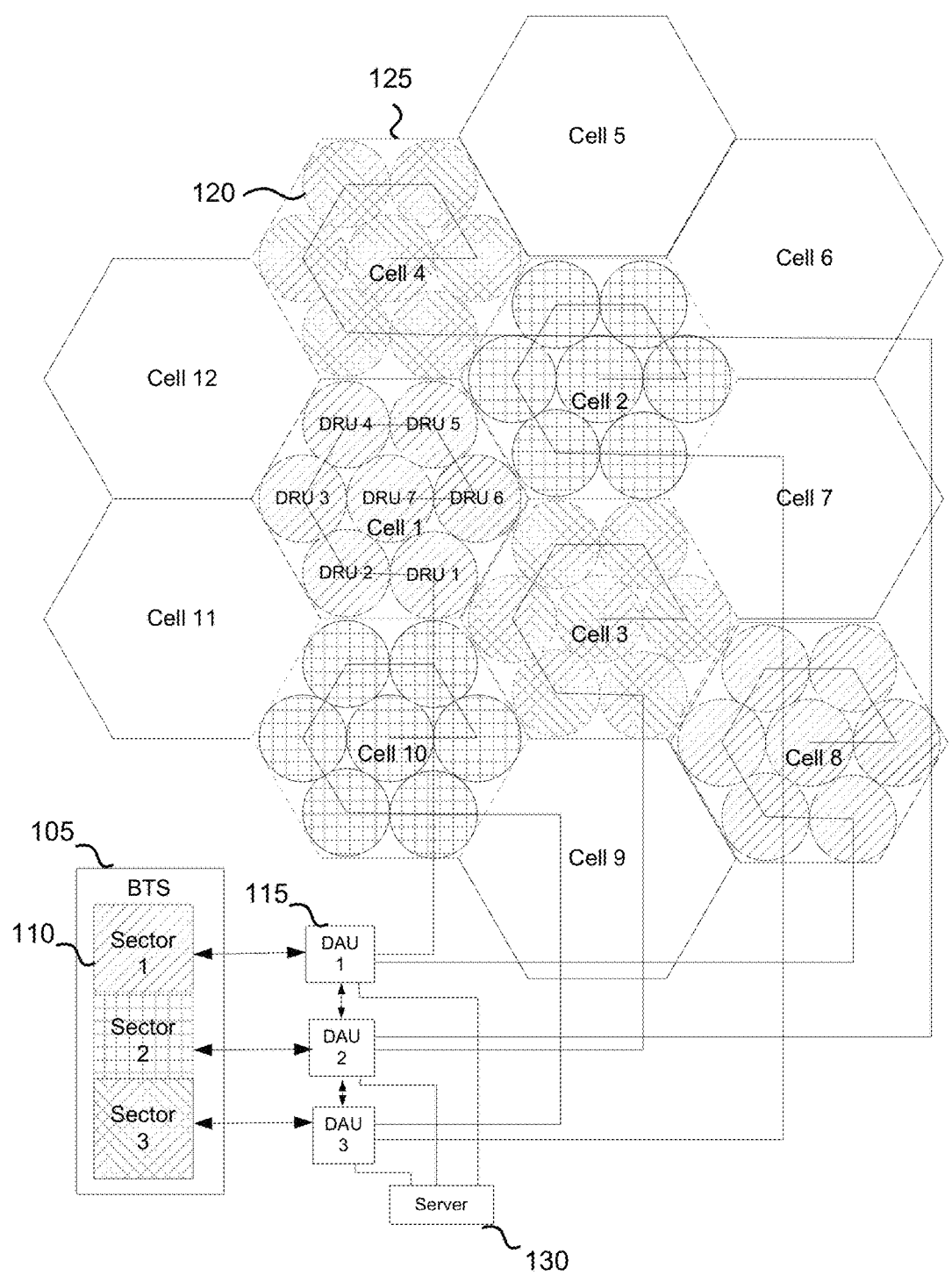
FIG. 1 is a high-level schematic diagram illustrating a wireless network system providing coverage to a geographical area according to an embodiment of the present invention.
Figure 2:
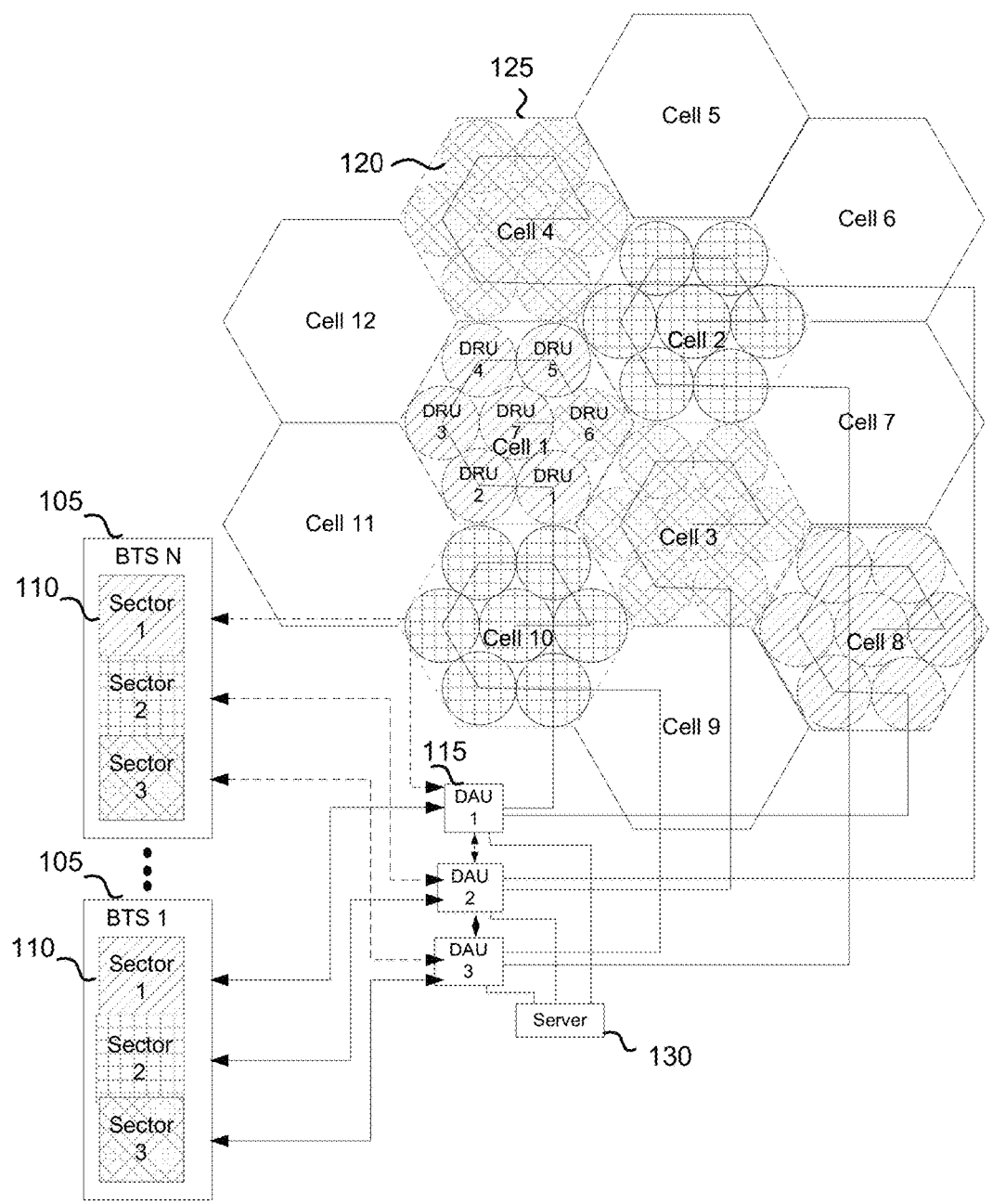
FIG. 2 is a high-level schematic diagram illustrating a wireless network system providing coverage to a geographical area according to an embodiment of the present invention.

FIGS. 1-2 are high-level schematic diagrams illustrating wireless network systems according to embodiments of the present invention. The configuration of these systems may allow the system to dynamically accommodate variations in wireless network loading and network carrier geographical reconfiguration and to further efficiently use base-station resources.

FIG. 1 is a diagram illustrating one wireless network system 100 that may provide coverage to a geographical area according to an embodiment of the present invention. System 100 may include a DAS, which may efficiently use base-station resources. One or more base stations 105 may be located in a central location and/or at a base-station hotel. One or more base stations 105 may include a plurality of independent outputs or radio resources, known as sectors 110. Each sector 110 may be responsible for providing wireless resources (e.g., RF carrier signals, Long Term Evolution Resource Blocks, Code Division Multiple Access codes, Time Division Multiple Access time slots, etc.). The resources may include one or more resources that allow a wireless user mobile device to effectively and wirelessly send and receive communications over a network. Thus, the resources may include one or more resources, such as those listed above, that allow a signal to be encoded or decoded in a manner to prevent the signal from interfering with or being interfered with by other wireless signals.

Base stations 105 may include hardware constraints that limit the resources that it may provide. For example, sectors 110 of base station 105 may include a channel card, which constrains the sectors to only providing RF carrier signals within one or more specific frequency bands.

Each sector may be coupled to a software-configurable radio (SCR) (which may also be referred to as a software-defined radio (SDR)) based digital access unit (DAU) 115, which may interface the sector 110 (and thus base station 105) with digital remote units (DRUB) 120. The coupling may represent a physical coupling. For example, DAU 115 may be connected to sector 110 and/or DRU 120 via a cable, a link, fiber, a high-speed optical fiber link, an RF cable, an optical fiber, an Ethernet cable, microwave line of sight link, wireless link, satellite link, etc. In some instances, DAU 115 is connected to sector 110 via an RF cable. In some instances, DAU 115 is connected to one or more DRUs via an optical fiber or Ethernet cable. An associated sector 110 and DAU 115 may be located near each other or at a same location. DAU 115 may convert signals (e.g., to different frequency bands); control routing of data and/or signals between sectors and DRUs; and/or provision sector resources across DRUs. For example, a DAS network may include router tables (e.g., sent to DAUs 115 by server 130) that identify specific base stations 105 which are to communicate with and/or allocate resources to specific DRUs 120 and that further identify paths (e.g., via one or more DAUs 115) that will enable such communication and/or allocation. Router tables may further identify frequency translations to be performed at one or more locations along the path (e.g., at a DAU receiving and/or transmitting signals directly to a sector; and/or at an end-path DRU). That is, the router tables may identify path positions at which frequency translations should be performed and/or the frequency translations that should be performed at those locations. DAU 115 may generate and/or store traffic statistics, such as a number of communications, calls, network-access sessions, etc. between sector 110 and one or more DRUs 120.

Each DAU 115 may be coupled to a plurality of digital remote units (DRU) 120. The plurality of DRUs 120 may be coupled to the DAU 115 through, e.g., a daisy-chain (indirectly coupling a DAU with one or more DRUs) and/or star configuration (directly coupling a DAU to multiple DRUs). FIG. 1 shows an example of daisy-chain configurations, wherein a DAU couples to a first DRU directly (e.g., direct connection from DAU 1 to DRU 1), a second DRU indirectly (e.g., indirect connection from DAU 1 to DRU 2 through DRU 1), a third DRU indirectly (e.g., indirect connection from DAU 1 to DRU 3 through DRUs 1 and 2), etc. FIG. 1 also shows an example of star configurations, wherein a DAU couples to multiple DRUs directly (e.g., direct connections from DAU 1 to DRU 1 and DRU 23).

Each of the DRUs can provide coverage within a geographical area physically surrounding the DRU. DRUs 120 may be strategically located to efficiently provide combined coverage across a larger geographical area (a "cell" 125). For example, DRUs 120 may be located along a grid, and/or coverage areas associated with adjacent DRUs 120 may be barely overlapping. A network may include a plurality of independent cells that span a total coverage area.

Each cell 125 may be assigned to a sector 110. FIG. 1, for example, shows an embodiment in which Sector 1 provides resources to Cells 1 and 8, Sector 2 to Cells 2 and 10, and Sector 3 to Cells 3 and 4. An associated sector may provide each DRU with resources, such as RF carriers, resource blocks, etc. In one embodiment, each of a plurality of sectors 110 is associated with a set of "channels" or frequency ranges. The set of channels associated with each sector 110 may be different from a set of channels associated with other sectors 110 in base station 105. In some instances, channels associated with one or more particular sectors 110 (and/or with one or more base stations 105) are fixed. A network may be configured such that neighboring cells 125 are associated with different channels (e.g., by being associated with different sectors 110), as shown in FIG. 1. This may allow channels to be reused across multiple cells without the risk of creating interference.

An uplink signal may be received at a DRU 120, e.g., from a cell phone. The received signal may be within a "field" frequency band or channel (e.g., a particular RF band, such as the cellular band). The signal may be translated at the DRU 120 from the field frequency band to a baseband frequency band. The translated signal may be transmitted (e.g., via an optical fiber and through any intervening DAUs 115 and DRUs 120) to a DAU 115 coupled to a sector 110, and the DAU 115 may further translate the signal from the baseband frequency band to a base-station frequency band (e.g., a same or different RF band, such as the PCS band). The DRU 120 may incorporate unique information associated with the DRU 120 into the signal that it transmits to the DAU 115, such that it may be determined that the uplink data in the signal was received by the particular DRU 120.

Conversely, a downlink signal may be received at a DAU 115 from a sector 110. The downlink signal may be within the base-station frequency band (e.g., a particular RF band). The DAU 115 may translate the signal from the base-station frequency band to a baseband frequency band. The translated signal may be transmitted (e.g., via an optical fiber cable) to a target DRU 120. Any other DAUs and/or DRUs in the path to the target DRU 120 are involved in passing the translated signal to the target DRU. At the target DRU 120, the translated signal may be further translated from the baseband frequency band to the field frequency band (e.g., a same or different RF band). The signal may then be transmitted, e.g., to the cell phone. Thus, both DAU 115 and DRU 120 may include a multi-directional signal converter, such that, e.g., RF signals may be converted to optical signals and optical signals to RF signals. Disclosed DAS architecture enables various base-station signals to be transported simultaneously to and from multiple DRUs 120. PEER ports may be used for interconnecting DAUs 115 and interconnecting DRUs 120.

Thus, base station 105 may be involved in bi-directional communications with user devices. Additionally or alternatively, base station 105 may transmit uni-directional communications to user devices. For example, beacons may be sent from a sector 110, via one or more DAUs 115 and one or more DRUs 120 to a user device. The beacon may include a signal including information as to which resources are provided by the sector 110 and thus, which resources are available to a user device within a geographic area associated with the DRU 120 transmitting the signal. For example, the beacon may identify a frequency band available for bi-directional signal communications in a geographical area associated with a DRU 120.

Sector resources (e.g., available frequency bands) may be dynamically re-provisioned amongst DRUs 120, e.g., via Flexible Simulcast. Each individual data packet (e.g., included in a downlink or uplink signal) may be provided with a unique identity to which DRU 120 it is associated with. The DAUs 115 may be interconnected, as shown in FIG. 1, to allow transport of data among multiple DAUs. This feature provides the unique flexibility in the DAS network to route signals between the sectors 110 and the individual DRUs 120.

DAU communications, routing tables or functions, switches and/or frequency translations may be partly controlled by one or more servers 130. The servers 130 may be in communication with one or more DAUs 115 and/or one or more DRUs 120. For example, the servers 130 may be physically or wirelessly coupled to DAUs 115 and wirelessly coupled to DRUs 120. Using information received from the one or more servers 130, DAUs 115 can dynamically route signals and provision resources to desired DRUs. Thus, DRUs 120 may be dynamically assigned (e.g., via software control) to sectors 110.

For example, DRUs 1-7 in Cell 1 may initially all be assigned to Sector 1. (FIG. 1.) Subsequently, DRU 5 may be assigned to Sector 3 and DRU 6 may be assigned to Sector 4. In such instances, signals to DRU 6 may pass from Sector 2 through DAU 2 and through DAU 1. (Conversely, signals may pass from DRU 6 through DAU 1 and DAU 2 to Sector 2.) Similarly, signals to DRU 5 may pass from Sector 3 through DAU 3, through DAU 2 and through DAU 1. In this manner, a sector may be indirectly connected with a larger subset of DRUs in a network or with all DRUs in a network.

Further, server 130 may communicate frequency-translation information to DAUs 115. The information may identify, e.g., a frequency translation to occur at a DAU 115, a DAU 115 that is to perform the frequency translation, a frequency band defining signals to be received at a DAU 115, and/or a frequency band in which signals transmitted from the DAU 115 should reside. For example, in FIG. 1, server 130 may send information to DAU 1 that Sector 1 operates in the cellular band. DAU 1 may then configure a DAU physical node to translate signals received from Sector 1 from the cellular band to a baseband (for optical transmission), and to translate signals received from a DRU 1-7 from the baseband to the cellular band.

Server 130 may also communicate (e.g., via a wireless network) frequency-translation information to one or more DRUs 120. The information may identify, e.g., a frequency translation to occur at a DRU 120, a DRU 120 that is to perform the frequency translation, a frequency band defining signals to be received at a DRU 120, and/or a frequency band in which signals transmitted from the DRU 120 should reside. For example, in FIG. 1, server 130 may wirelessly send information to DRU 1 that the DRU is to operate in the PCS band. DAU 1 may then configure a DRU physical node to receive PCS signals from user devices, translate user-device signals from the PCS band to a baseband (for optical transmission), and to translate signals received from DAU 1 from the baseband to the PCS band.

DAUs 115 may be configured to control a gain (in small increments over a wide range) of downlink and uplink signals transported between the DAU 115 and a base station sector 110 (or base stations) connected to that DAU 115. This configuration allows a flexibility to simultaneously control the uplink and downlink connectivity of a path between a particular DRU (or a group of DRUs via the associated DAU or DAUs) and a particular base station sector. If, e.g., a DRU 120 is reassigned from one sector 110 to another 110, DAUs 115 may gradually adjust the gain of signals to allow for a soft hand-off between the sectors (e.g., thereby preventing a call from being dropped).

DAUs 110 may be physically and/or virtually connected. For example, in one embodiment, DAUs 110 are connected via a cable or fiber (e.g., an optical fiber, an Ethernet cable, microwave line of sight link, wireless link, or satellite link). In one embodiment, a plurality of DAUs 110 are connected to a wireless network, which allows information to be transmitted from one DAU 110 to another DAU 110 and/or allows information to be transmitted from/to a plurality of DAUs 110.

As shown in FIG. 2, a load-balancing system may include multiple base stations (or multiple base station hotels) 105. Different base stations 105 may be associated with the same, or different frequency bands. Base stations 105 may be interconnected, e.g., to serve a geographic area. The interconnection may include a direct connection extending between the base stations (e.g., a cable) or an indirect connection (e.g., each base station connecting to a DAU, the DAUs being directly connected to each other). The greater number of base stations may increase the ability to add capacity for a given cell. Base stations 105 may represent independent wireless network operators and/or multiple standards (WCDMA, LTE, etc.), and/or they may represent provision of additional RF carriers. In some embodiments, base station signals are combined before they are connected to a DAU, as may be the case for a Neutral Host application. In one instance, as shown in FIG. 2, sectors from BTS 1 are directly coupled to the same DAUs and/or DRUs that are directly coupled to sectors to BTS N. In some other instances, one or more sectors from different BTS may be directly coupled to DAUs not shared by sectors of one or more other DAUs. Load balancing may or may not be applied differently to the different base stations 110. For example, if DRU 5 is reassigned from Sector 1 to Sector 2 in BTS 1, it may or may not be similarly reassigned in BTS N.

Referring to FIG. 2 and by way of example, DAU 1 receives downlink signals from BTS 1, Sector 1. DAU 1 translates the signals (e.g., RF signals to optical signals) and an optical fiber cable transports the desired signals to DRU 1. The optical cable transports all the optical signals to DRU 2. The other DRUs in the daisy chain are involved in passing the optical signals onward to DRU 7. DAU 1 is networked with DAU 2 to allow the downlink signals from BTS 1, Sector 2 to be transported to all the DRUs in Cell 1. DAU 1 receives downlink signals from BTS Sector N, Sector 1. DAU 1 translates the signals (e.g., RF signals to optical signals) and the optical fiber cable transports the desired signals to DRU 1. The optical cable transports all the optical signals to DRU 2. The other DRUs in the daisy chain are involved in passing the optical signals onward to DRU 7. The additional base stations provide the capability to add capacity for Cell 1.

As described above, a DAS may thus include one or more frequency-transition points, at which a signal is translated from an initial frequency band to a translated frequency band. This may allow an RF signal to be translated into an optical signal to quickly and efficiently transport the signals. As described above, both uplink and downlink signals may undergo two translations: one at a DRU and one at a DAU. An uplink signal may be translated from a field frequency band to a baseband frequency band to a base-station frequency band, and a downlink signal may undergo an opposite series of translations. A Physical Node of a DAU or DRU may translate a signal.

Figure 3:
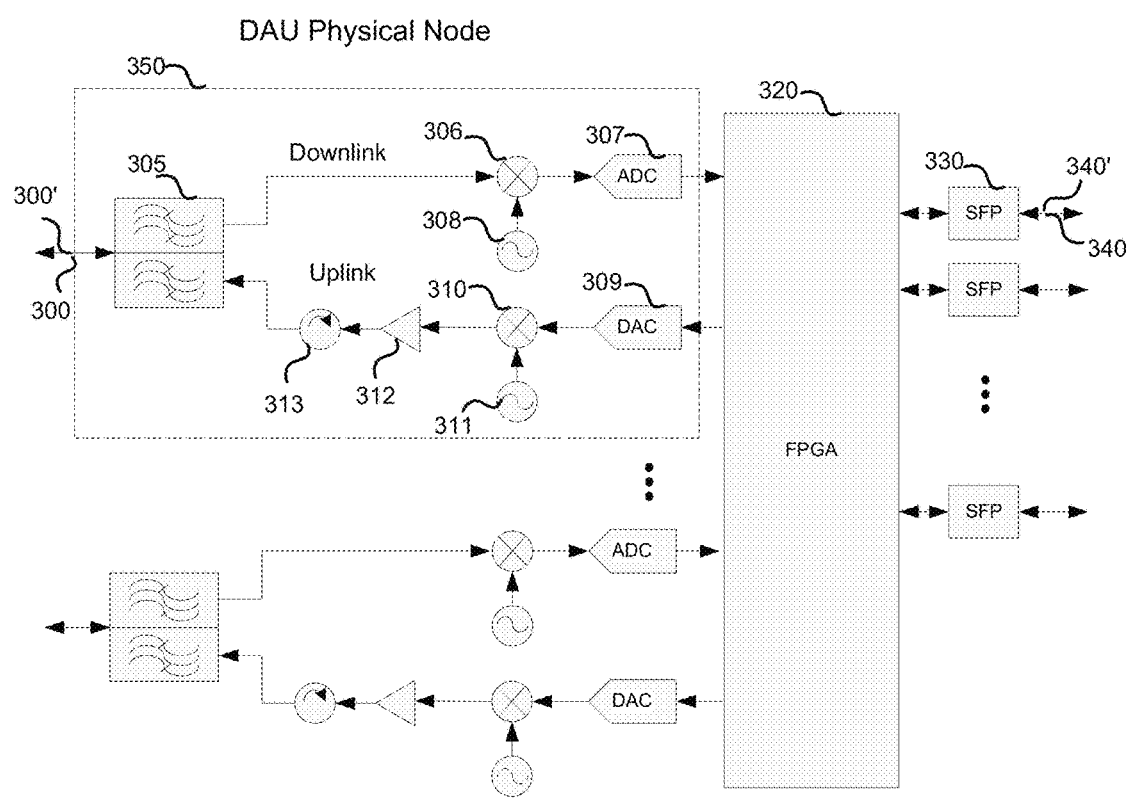
FIG. 3 is a high-level schematic diagram illustrating Physical Nodes in a Digital Access Unit (DAU) according to an embodiment of the present invention.

FIG. 3 shows a high-level schematic diagram illustrating a physical node 350 in a DAU. As shown, physical node 350 may process both downlink and uplink signals, which may be possible due to the downlink and uplink signals operating at different frequencies. Physical node 350 may process a received downlink signal 300' to produce a downlink output 340' and may further process a received uplink signal 340 to produce an uplink output 300. However, in some embodiments, distinct physical nodes 350 may process uplink and downlink signals.

A downlink signal 300' may be received by the physical node 350 (e.g., from a sector 110 of a base station 105). The received signal may not be isolated, e.g., from uplink signals. Therefore, the received signal may be processed by diplexer 305. Diplexer 305 may filter signal 300'/300 to isolate downlink signals 300' for processing. The isolated downlink signal is transmitted to mixer 306, which mixes the isolated downlink signal with a reference signal produced by oscillator 308. By controlling spectral properties of the reference signal, the downlink signal may be translated to a desired frequency band (e.g., translating a downlink signal from a base-station frequency band to a baseband frequency band or to an intermediate frequency band). The combined signal may be converted from an analog signal to a digital signal by analog-to-digital converter 307. The converted signal may be transmitted from DAU physical node 350 to a chip or field-programmable gate array (FPGA) 320, which may process and/or route the signal. The FPGA may, e.g., route the signal and/or performing signal processing, such as digital filtering. The processed signal may be converted from an electrical signal to an optical signal by a small form factor pluggable unit (SFP) 330. The optical signal may then be transmitted, e.g., via an optical fiber to a DAU 115 or DRU 120 coupled to a DAU hosting the physical node.

An uplink signal 340 (e.g., an optical signal) may also be received by SFP 330 (e.g., from a DRU 120 or DAU 115 coupled to the instant DAU via an optical fiber). SFP 330 may include a photo diode and may convert the uplink signal 340 from an optical signal to an electrical signal. The electrical signal may be processed (and/or routed) by a chip or FPGA 320 and then received by DAU physical node 350. The digital-to-analog converter 309 may convert the received signal from a digital signal to an analog signal. The analog signal may be transmitted to mixer 310, which mixes the isolated signal with a reference signal produced by oscillator 311. By controlling spectral properties of the reference signal, the uplink signal may be translated to a desired frequency band (e.g., translating an uplink signal from a baseband frequency band to a base-station frequency band). The combined signal may be amplified by amplifier 312, and optionally processed by a circulator 313. The signal may then be transmitted through diplexer 305 to a base-station sector 110 (e.g., via an RF cable).

Figure 4:
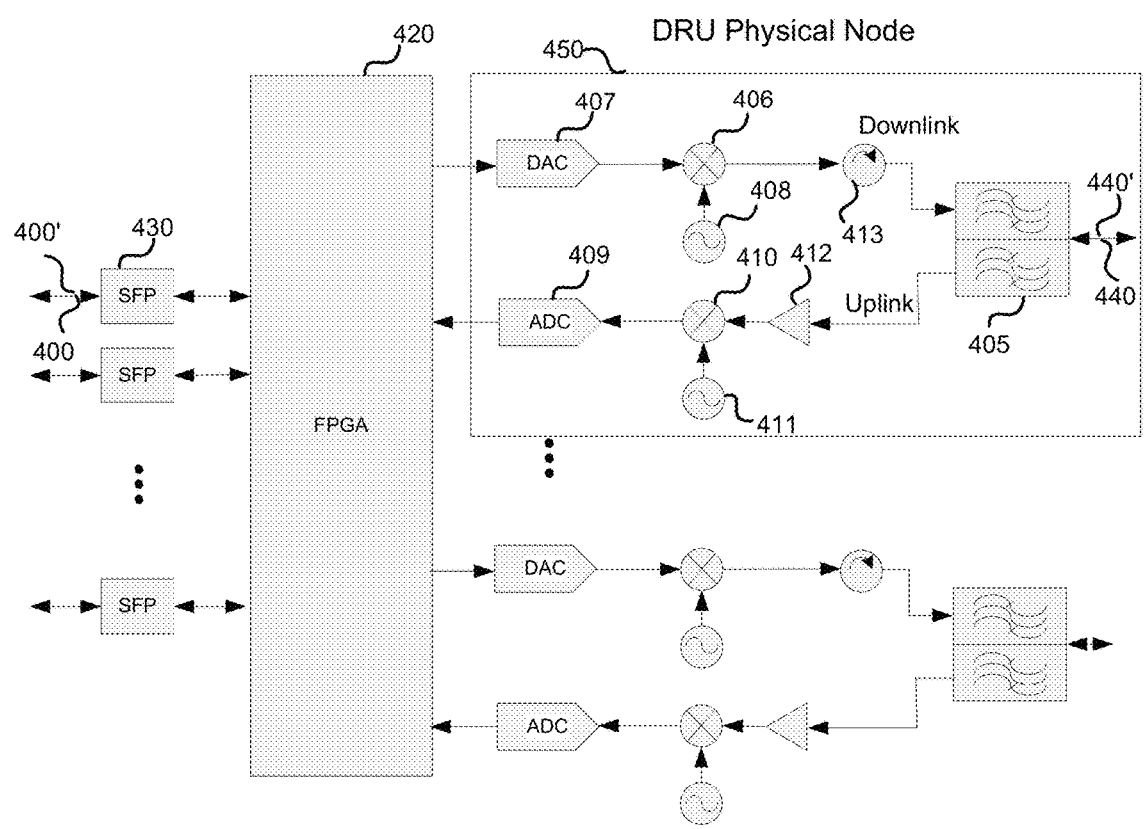
FIG. 4 is a high-level schematic diagram illustrating Physical Nodes in a Digital Remote Unit (DRU) according to an embodiment of the present invention.

FIG. 4 shows a high-level schematic diagram illustrating a physical node 450 in a DRU. Again, physical node 450 may process both downlink and uplink signals, which may be possible due to the downlink and uplink signals operating at different frequencies. Physical node 450 may process a received downlink signal 400' to produce a downlink output 440' and may further process a received uplink signal 440 to produce an uplink output 400. However, in some embodiments, distinct physical nodes 450 may process uplink and downlink signals.

A downlink signal 400' may be received by SFP 430 (e.g., from another DRU 120 or from a DAU 115). The received signal may be an optical signal. SFP 430 may include a photo diode and may convert the downlink signal 400' from an optical signal to an electrical signal. The electrical signal may be processed (and/or routed) by FPGA 420 and then received by the DRU physical node 450. A digital-to-analog converter 407 may convert the received signal from a digital signal to an analog signal. The analog signal may be transmitted to mixer 406, which mixes the isolated signal with a reference signal produced by oscillator 408. By controlling spectral properties of the reference signal, the uplink signal may be translated to a desired frequency band (e.g., translating a downlink signal from a baseband frequency band to a field frequency band). The signal may then be transmitted through diplexer 405 to an antenna (e.g., via an RF cable) to wirelessly transmit the signal to a user device (e.g., a cellular phone).

An uplink signal 440 may also be received by physical node 450 (e.g., from an antenna wirelessly receiving signals from a user device). The received signal may not be isolated, e.g., from uplink signals. Therefore, the received signal may be processed by diplexer 405. Diplexer 405 may filter signal 440'/440 to isolate uplink signals 440 for processing. An amplifier 412 may process the isolated uplink signal The amplified signal may be transmitted to mixer 410, which mixes the isolated uplink signal with a reference signal produced by oscillator 411. By controlling spectral properties of the reference signal, the uplink signal may be translated to a desired frequency band (e.g., translating an uplink signal from a field frequency band to a baseband frequency band). The combined signal may be converted from an analog signal to a digital signal by analog-to-digital converter 409. The converted signal may be transmitted from the DRU physical node 450, e.g., to FPGA 420, which may process and/or route the signal. The processed signal may be converted from an electrical signal to an optical signal by an SFP 430. The optical signal may then be transmitted, e.g., via an optical fiber to a DAU 115 or DRU 120 coupled to a DRU hosting the physical node.

Thus, DAU physical node 350 and DRU physical node 450 may each include one or more frequency translators. In the depicted embodiments, the frequency translators included a mixer (e.g., mixer 306, 310, 406 or 410) and an oscillator (oscillator 308, 311, 408 or 411). In FIGS. 3 and 4, separate frequency translators were provided for the uplink and downlink processing streams and generally had reciprocal functions across the two streams.

As described, the frequency translators in the DAU physical node 350 may serve to convert signals between a base-station frequency band and a baseband frequency or intermediate frequency band. The frequency translators in the DRU physical node 450 may serve to convert signals between a baseband frequency band and a field frequency band. The base-sector and field frequency bands may include RF bands (e.g., the 800 band, cellular band, PCS band, 700 MHz band, 1.49 GHz band, AWS band, BRS/EBS band, etc.). In some instances, the base-station frequency band and the field frequency band associated with any given path are the same, and in some instances they are different. As illustrated in FIG. 4, multiple DRU physical nodes may be present in a DRU, enabling transmission at multiple bands from a single DRU.

A system may be configured such that an operator may control frequency translations occurring at a DAU and/or DRU. For example, an operator may identify a frequency translation via a computer coupled via a server that wirelessly communicates with the DAU and/or DRU. In one instance, one or more frequency translators are configurable, such that, e.g., the translation occurring at a given frequency translator may be adjusted by an operator. Thus, for example, an output of an oscillator (oscillator 308, 311, 408 or 411) may be adjustable and not fixed. In one instance, which physical nodes are active is configurable. For example, each physical node may be configured to perform particular frequency translations, and one or more select nodes may be activated based on frequency-translation objectives.

Figure 12:
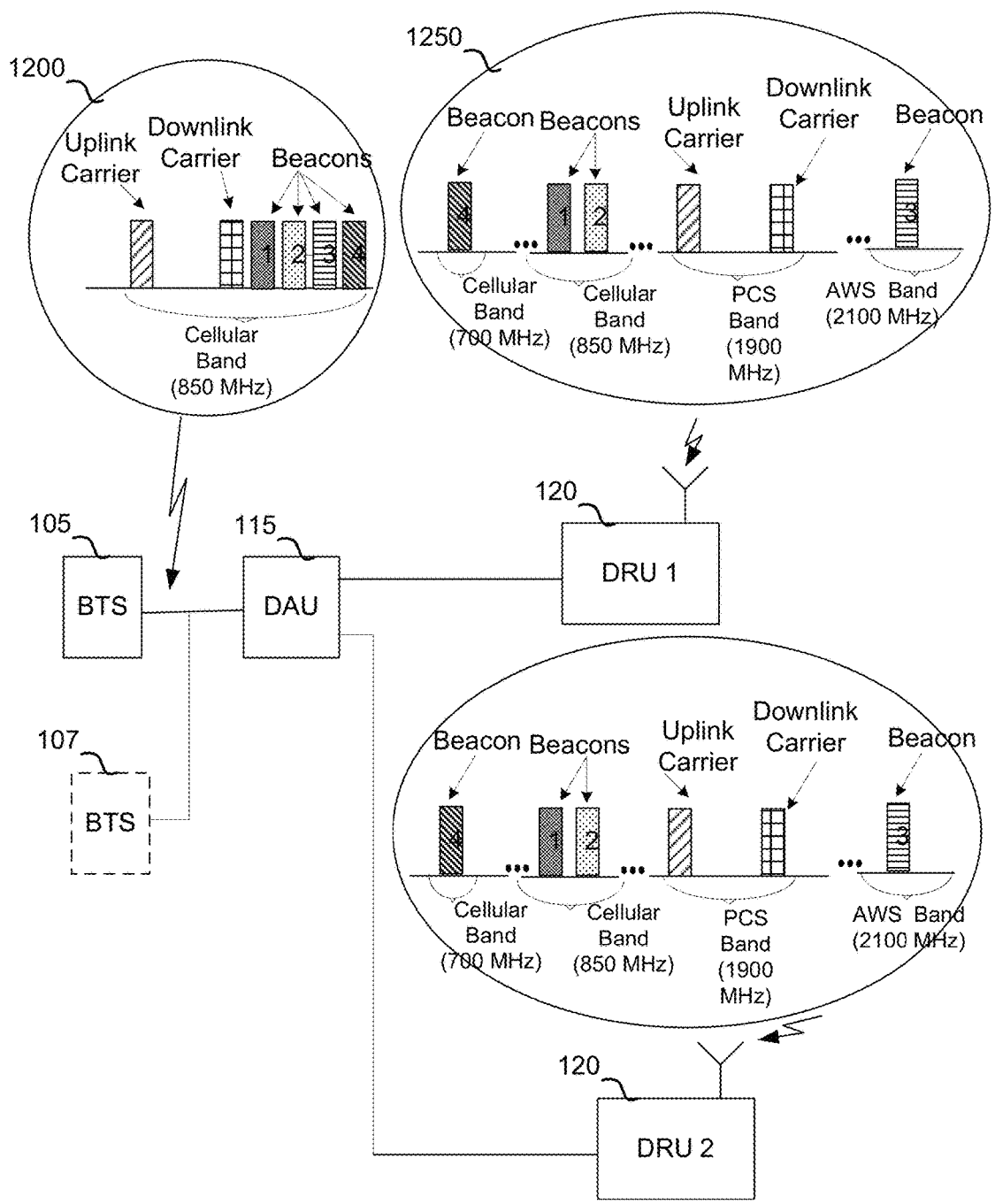
FIG. 12 is a high-level schematic diagram illustrating a wireless network system transmitting signals according to an embodiment of the present invention.

As illustrated in FIG. 3, the signal presented to the DAU from the BTS is illustrated as downlink signal 300', which is received at the DAU physical node 350. After frequency translation using mixer 306 and A/D conversion using ADC 307, the digital signal is presented to the FPGA 320. The signal transmitted to the DRU is illustrated as downlink output 340'. At the DRU, the received signal is illustrates as received downlink signal 400'. After processing by FPGA 420, the DRU physical node 450 converts the signal to an analog signal using DAC 407 and then uses mixer 406 to frequency translate the signal to the desired frequency band (e.g., 1900 MHz as illustrated in FIG. 12). Thus, using the mixers illustrated in FIGS. 3 and 4, it is possible to frequency translate the signal from a first frequency band used by the BTS (e.g., 850 MHz) to a second frequency band used by the DRU (e.g., 1900 MHz, 2100 MHz, or the like). Frequency translation for the uplink signals (e.g., from 1900 MHz to 850 MHz) is provided using mixers 410 (e.g., translation from 1900 MHz to an intermediate frequency or baseband frequency) and 310 (e.g., translation from the intermediate frequency or baseband frequency to 850 MHz) as will be evident to one of skill in the art.

Figure 5:
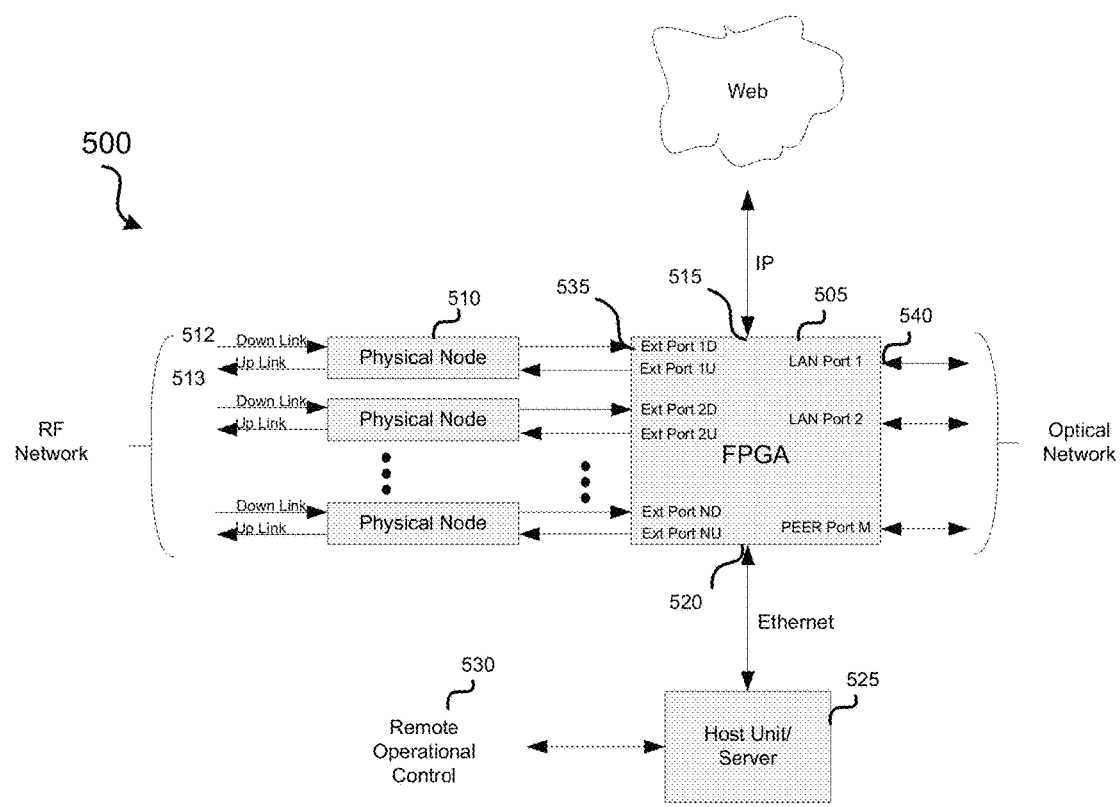
FIG. 5 is a high-level schematic diagram illustrating a DAU according to an embodiment of the present invention.

FIG. 5 illustrates components of a DAU 500 according to an embodiment of the invention. DAU 500 may include one or more FPGAs 505 (e.g., a router), which may process signals and/or direct traffic between various ports (e.g., LAN Ports, PEER Ports and the External Ports). DAU 500 may include one or more ports 515 and 520 that may, e.g., enable DAU to connect to the Internet and/or a Host Unit or a server 525 (e.g., Server 130). Server 525 may at least partly configure the DAU, control frequency translations of the DAU (e.g., by activating select physical nodes 510 or altering frequency translations occurring at physical nodes 510) and/or control the routing of the signals between various FPGA ports. Server 525 may be, e.g., at least partly controlled by a remote operational control 530 (e.g., to set re-assignment conditions, identify assignments, store assignments, input network configurations, receive/collect/analyze network usage, etc.).

DAU 500 may include one or more physical nodes 510. Physical nodes 510 may include configurations and/or operations similar to those described with respect to physical node 350 shown in FIG. 3. Different physical nodes 510 may be used for different operators, different frequency bands, different frequency translations, different channels, different base stations, etc. As described above, a physical node 510 may process both downlink and uplink signals (e.g., combining them via a duplexer) and keep the signals separate. Inclusion of multiple physical nodes 510 in a single DAU 500 may allow a DAU to process multiple types of signals simultaneously and/or dynamically adjust the types of signals that it is configured to process.

The physical nodes 510 may be coupled to FPGA 505 by one or more first-end ports 535. Each physical node 510 may include one, two, or more ports, such as first-end ports, each of which may allow signals (e.g., RF signals and/or signals from/to a sector) to be received by or transmitted from DAU 500. In some embodiments, a plurality of physical nodes 510 each includes a Downlink port 512 and an Uplink port 513. In some embodiments, a physical node 510 may also include an additional Uplink port, e.g., to handle a diversity connection. Output ports (e.g., Downlink port 512 and Uplink port 513) may be coupled to one or more ports (e.g., RF pots) of a base station. Thus, DAU 500 may be physically coupled to a base station.

FPGA 505 may include one or more second-end ports 540, which may couple DAU 500 to one or more DRUs or DAUs (e.g., via an optical fiber, Ethernet cable, etc.). The second-end ports 540 may include LAN or PEER ports. Second-end ports 540 may be configured to send and/or receive signals, such as digital and/or optical signals. In one embodiment, the second-end ports 540 are connected (e.g., via an optical fiber) to a network of DAUs and DRUs. The network connection can also use copper interconnections such as CAT 5 or 6 cabling, or other suitable interconnection equipment.

FPGA 505 may encode signals for transportation over the optical link as well as decodes the optical signals from the optical link. The DAU can monitor traffic on the various ports and either route this information to a server or store this information locally.

The DAU may be connected to the internet network, e.g., using IP. An Ethernet port 520 may be used to communicate between the Host Unit 525 and the DAU 500. The DRU may connect directly to the Remote Operational Control center 530 via the Ethernet port 520.

Figure 6:
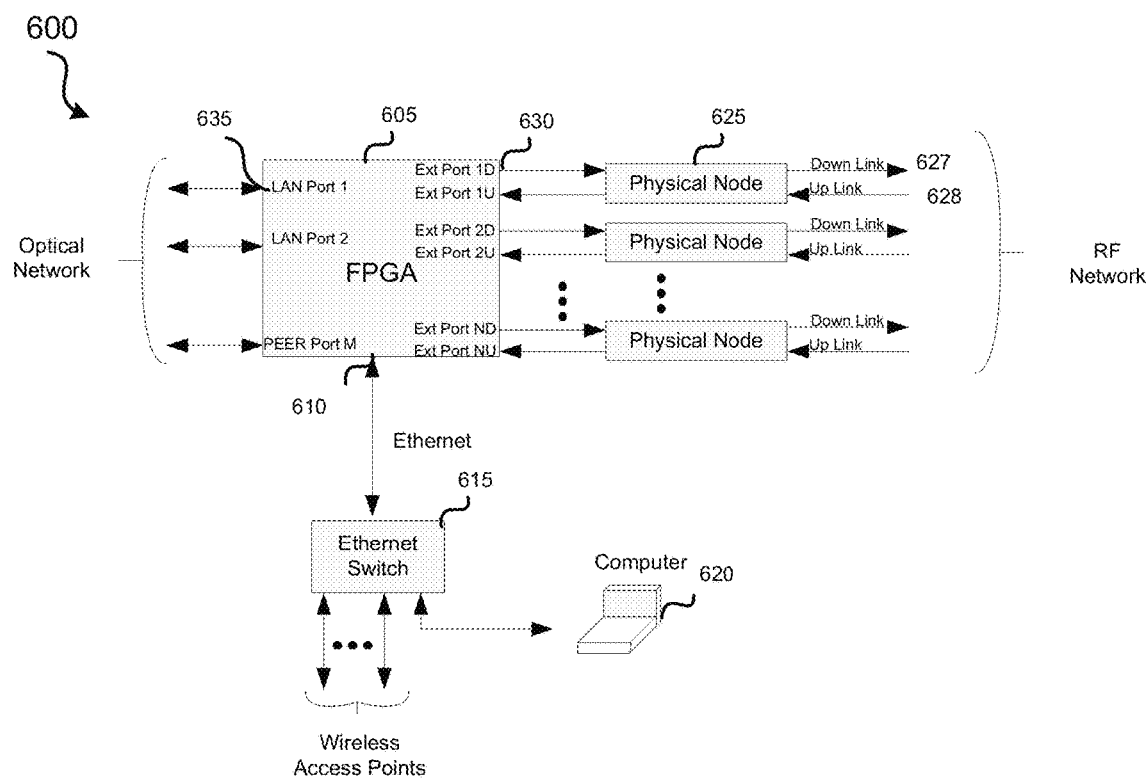
FIG. 6 is a high-level schematic diagram illustrating a DRU according to an embodiment of the present invention.

FIG. 6 illustrates components of a DRU 600 according to an embodiment of the invention. DRU 600 may include one or more FPGAs 605 (e.g., a router), which may process signals and/or route signals. The FPGA may direct data between select ports (e.g., between LAN and PEER ports to the selected External ports). DRU may include a network port 610, which may allow DRU 600 to couple (via an Ethernet Switch 615) to a (e.g., wireless) network. Through the network, DRU 600 may then be able to connect to a computer 620. Thus, a remote connection may be established with DRU 600.

FPGA 605 may be configured by a server, such as server 130, server 525, a server connected to one or more DAUs, and/or any other server. The FPGA 605 may direct data streams (e.g., the downlink data stream from the LAN and PEER ports to the selected External D ports and the uplink data stream from the External U ports to the selected LAN and PEER ports).

Network port 610 may be used as a Wireless access point for connection to the Internet. Thus, a remote computer wireless access point may be able to connect to the Internet. The Internet connection may, e.g., established at the DAU and Internet traffic may be overlaid with the data transport between the DRUs Physical Nodes and the DAU Physical Nodes.

DRU 600 may include one or more physical nodes 625, which may be connected to FPGA 605 (e.g., via external ports). Physical nodes 625 may include configurations and/or operations similar to those described with respect to physical node 450 shown in FIG. 4. Different physical nodes can be used for different operators, different frequency bands, different channels, different base stations, etc. Inclusion of multiple physical nodes 625 in a single DRU 600 may allow a DRU to process multiple types of signals simultaneously and/or dynamically adjust the types of signals that it is configured to process.

Each physical node 625 may include one, two, or more ports, such as first-end ports 630, each of which may allow signals (e.g., RF signals and/or signals from mobile devices) to be received by or transmitted from DRU 500. In some embodiments, a plurality of physical nodes 625 each include one or more ports configured to send/receive signals (e.g., RF signals) from/to DRU 600. The ports may include, e.g., a Downlink port 627 and an Uplink port 628. In some embodiments, an additional Uplink port exists for handling a diversity connection. Physical node ports (e.g., Downlink output port 627 and Uplink output port 628) may be connected to one or more antennas (e.g., RF antennas), such that signals may be received from and/or transmitted to, e.g., mobile wireless devices.

FPGA 605 may include one or more second-end ports 635, which may couple DRU 600 to one or more DAUs or DRUs. Second-end ports 635 may include LAN or PEER ports, which may (e.g., physically) couple DRU 600 to one or more DAUs or DRUs via an optical fiber.

Figure 7:
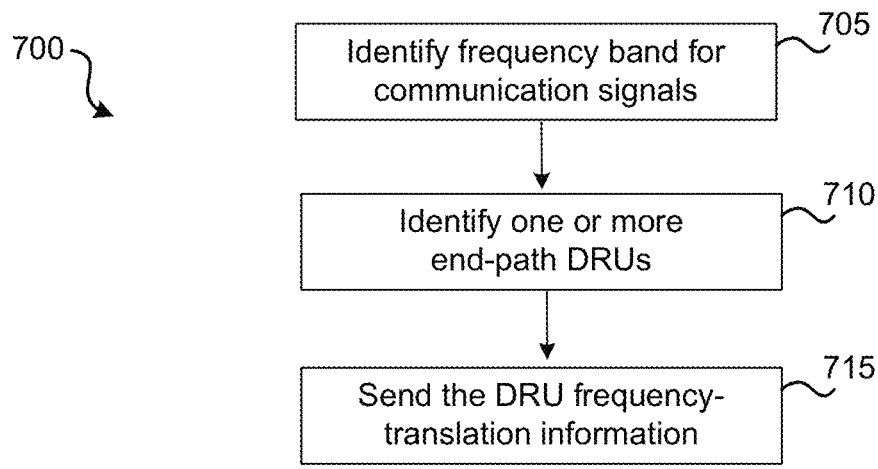
FIG. 7 is a high-level flowchart illustrating a method of identifying frequency-translation information according to an embodiment of the present invention.

FIG. 7 illustrates a method 700 of configuring a communication system to dynamically adjust frequency bands in operation according to some embodiments of the invention. At 705, a frequency band for communication signals is identified. The frequency band may be associated with particular types of communications (e.g., bi-directional uplink/downlink communications or uni-directional beacon communications). The frequency band may be associated with one or more particular DRUs, one or more particular base stations or base-station sectors, and/or one or more geographic coverage areas. The frequency band may be identified based on input received from an operator. For example, the operator may have entered the input into a computer in communication with a server 130, e.g., based on its connection with the Internet or a direct physical connection between the computer and the server 130. The input may have included, one or more lower bounds and one or more upper bounds of a frequency range or a frequency-band shorthand identifying a well-known frequency band (e.g., the 800 band, cellular band, PCS band 700 MHz band, 1.49 GHz band, AWS band, BRS/EBS band). In some instances, the frequency band is at least partly or completely non-overlapping with a frequency in which a base-station associated with the communication operates.

At 710, one or more end-paths DRU is identified. The end-path DRUs may include all DRUs communicating with a base station, all DRUs communicating with a base-station sector, a particular DRU (e.g., identified by an operator via input to a computer), a DRU associated with a geographical coverage area (e.g., identified by an operator via input to a computer), etc.

At 715, frequency-translation information is sent to the DRU. The frequency-translation information may include an identification of physical nodes that should be activated/deactivated at the DRU, a frequency translation that the DRU should perform, a field frequency band, etc. The frequency-translation information may be based on the frequency band identified at 705 and a baseband frequency band. In some instances, the frequency-translation information is further based on a base-station frequency band. The frequency-translation information may be wirelessly sent to the DRU.

Figure 8:
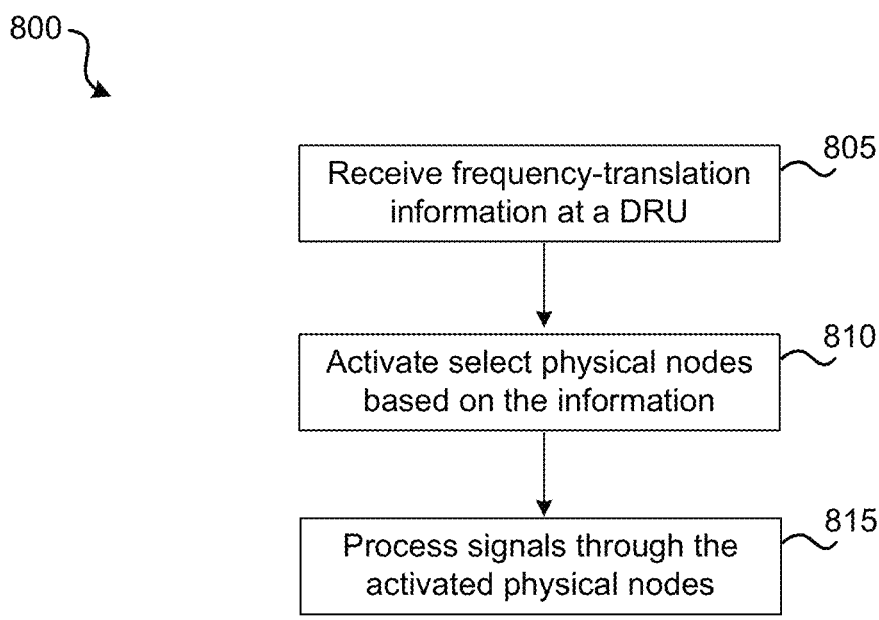
FIG. 8 is a high-level flowchart illustrating a method of processing signals according to an embodiment of the present invention.

FIG. 8 illustrates a method 800 of configuring a communication system to dynamically adjust frequency bands in operation according to some embodiments of the invention. At 805, frequency-translation information (e.g., such as frequency-translation information sent at 715 of method 700) is received at a DRU. The information may be received over a wireless network.

At 810, select physical nodes are activated based on the information. In some instances, the information may identify which nodes to activate. In some instances, the DRU determines which nodes to activate based on the information. For example, the information may identify a frequency translation that is to occur at the DRU, and the DRU may identify physical-node translating capabilities and determine which physical nodes may accomplish the translation objectives. Frequency translations occurring at particular physical nodes may or may not be adjusted based on the information.

At 815, signals are processed through the activated physical nodes. The signals may include, e.g., downlink signals, uplink signals and/or beacon signals. Different types of signals may undergo different processing and may be processed by different physical nodes.

Figure 9:
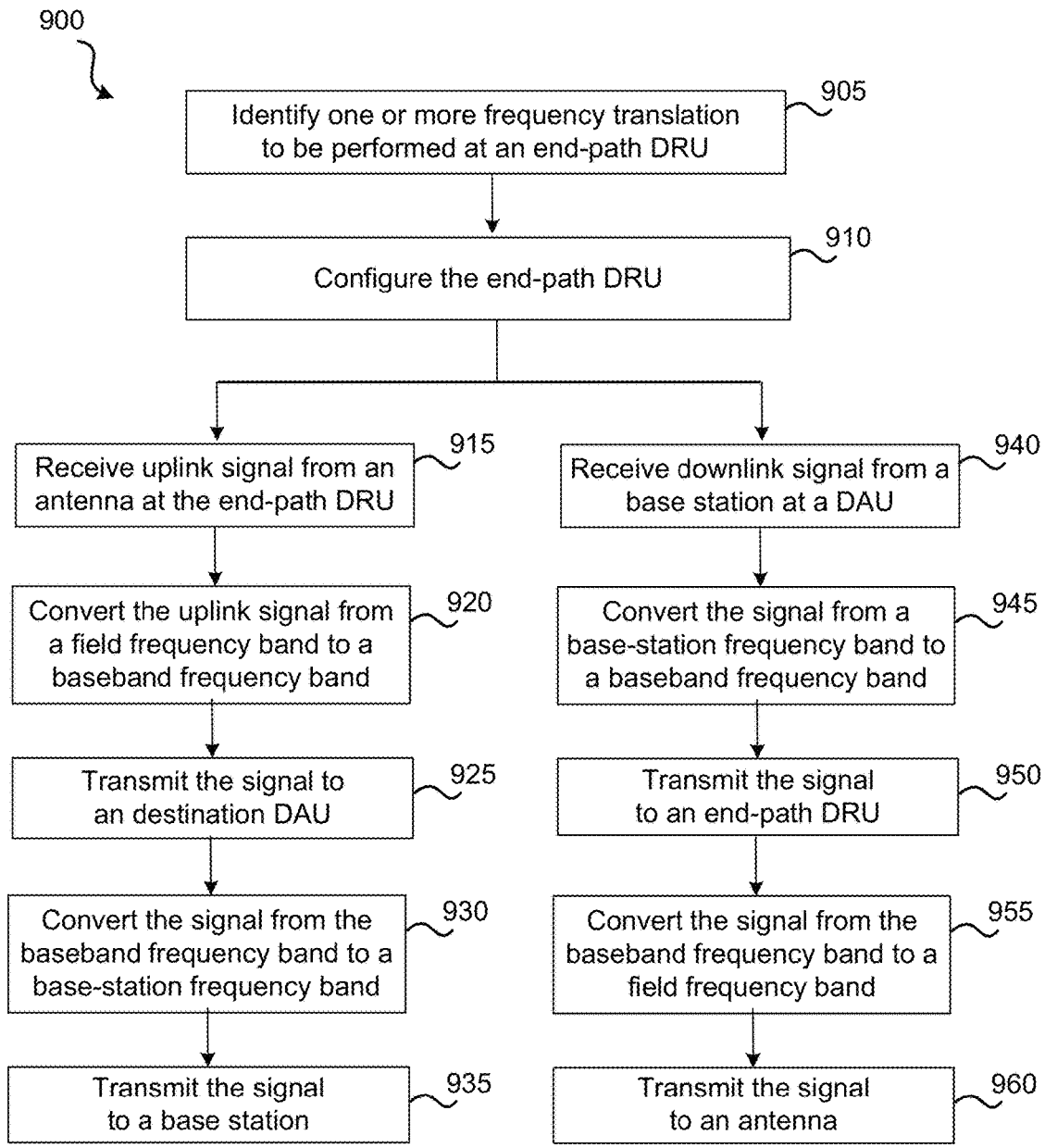
FIG. 9 is a high-level flowchart illustrating a-transmitting signals according to an embodiment of the present invention.

FIG. 9 is a simplified flow chart illustrating a method 900 of configuring a communication system to dynamically adjust frequency bands in operation according to some embodiments of the invention. At 905, a frequency translation to be performed at an end-path DRU is identified. For example, an operator may enter input identifying a frequency band to be associated with a particular DRU, a particular geographic coverage area associated with a DRU, a particular base-station sector or a particular base station. The input may include an indication of a well-known band (e.g., the 800 band, cellular band, PCS band 700 MHz band, 1.49 GHz band, AWS band, BRS/EBS band), bounds on a range, etc. The frequency translation may be identified based on a known baseband frequency band, which will define signals received by the DRU. The frequency translation may be specific to a particular type of communication (e.g., uplink/downlink communications, bi-directional communications, communications associated with a particular operator, etc.). This selectivity may be identified by operator input (e.g., specifying that the frequency translation is only to be performed for bi-directional communications involving a DRU) or may be identified by a system (e.g., determining that frequency-band selections entered by a particular operator would not affect frequency translations of communications associated with other operators).

At 910, the end-path DRU is configured. For example, the DRU may receive information about the frequency translation identified at 905. The DRU may activate select physical nodes and/or adjust frequency translations occurring with select physical nodes (e.g., by adjusting reference signals contributing to mixing). In some instances, uplink and downlink processing streams of the DRU are configured in a reciprocal manner, such that a frequency translation occurring in the uplink processing stream is the opposite of that occurring in the downlink-processing stream.

Method 900 continues with the receipt of uplink signals (915) and/or downlink signals (940). At 915, an uplink signal is received (e.g., via an RF cable) from an antenna at the end-path DRU. At 920, the uplink signal is converted from a field frequency band to a baseband frequency band. Proper conversion may depend upon the configuration of the DRU performed at 910. The uplink signal may be further processed (e.g., to convert it to an optical signal). At 925, the signal is transmitted (e.g., via an optical fiber) to a destination DAU (e.g., a DAU directly coupled to a destination base station). The transmission may involve transmitting the signal through one or more intermediate DRUs and/or one or more intermediate DAUs. At 930, the signal is converted from the baseband frequency band to a base-station frequency bad at the end-path DAU. The signal may be further processed (e.g., to convert it from an optical signal). At 935, the signal is transmitted (e.g., via an RF cable) to a base station.

At 940, a downlink signal is received (e.g., via an RF cable) from a base station at a DAU (e.g., directly coupled to the base station). At 945, the downlink signal is converted from a base-station frequency band to a baseband frequency band. The downlink signal may be further processed (e.g., to convert it to an optical signal). At 950, the signal is transmitted (e.g., via an optical fiber) to an end-path DRU (e.g., a DRU coupled to an antenna that will transmit the signal to a user device). The transmission may involve transmitting the signal through one or more intermediate DAUs and/or one or more intermediate DRUs. At 955, the signal is converted from the baseband frequency band to the field frequency band. The conversion (and thus the field frequency band) may depend upon the configuration of the DRU performed at 910. The signal may be further processed (e.g., to convert it from an optical signal). At 960, the signal is transmitted (e.g., via an RF cable) to an antenna, which may then transmit the signal to a user device.

Figure 10:
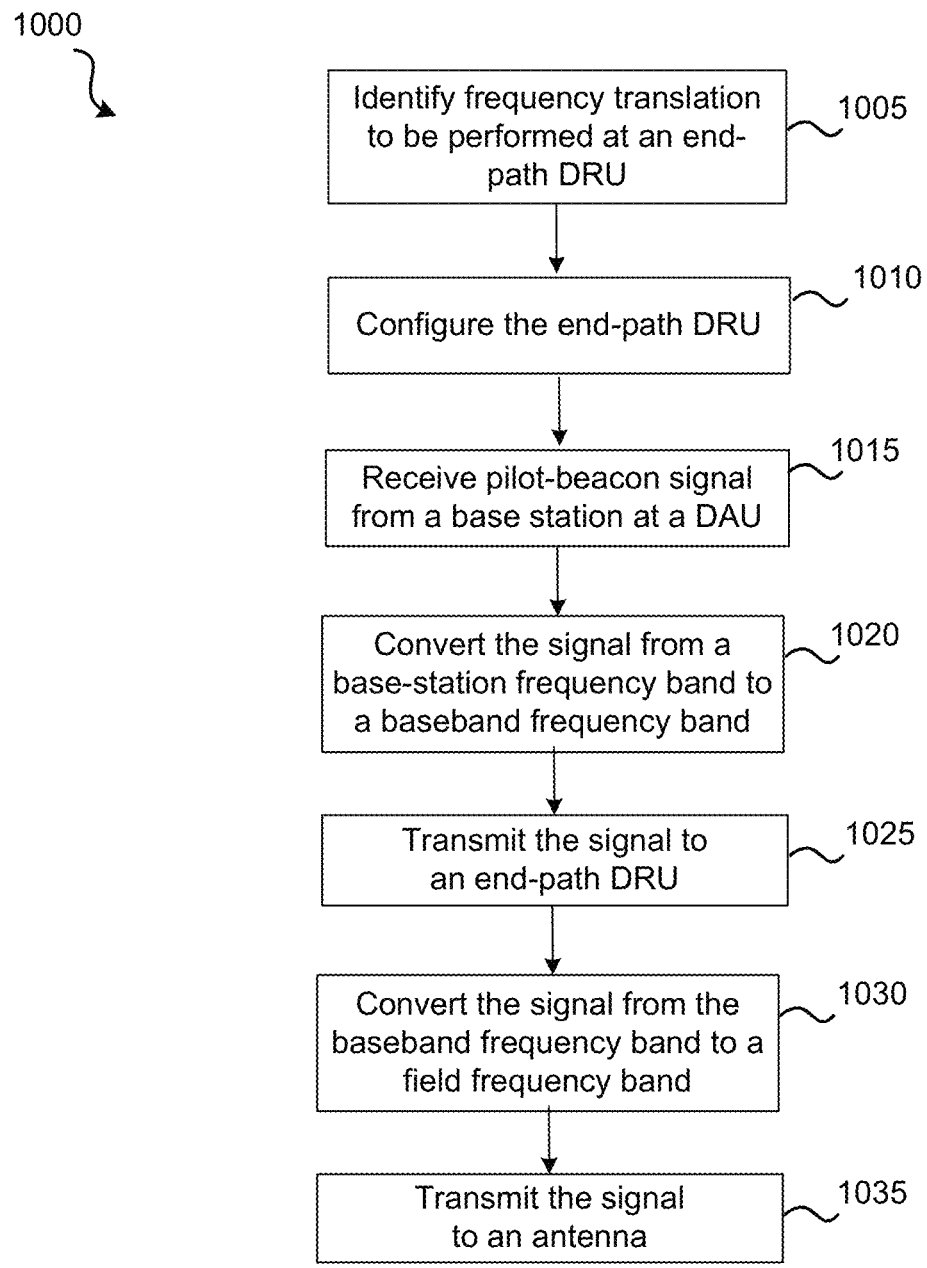
FIG. 10 is a high-level flowchart illustrating a-transmitting signals according to an embodiment of the present invention.

FIG. 10 is a simplified flow chart illustrating a method 1000 of configuring a communication system to dynamically adjust frequency bands in operation according to some embodiments of the invention. At 1005, one or more frequency translations to be performed at an end-path are identified. For example, an operator may enter input identifying one or more frequency bands to be associated with a particular DRU, a particular geographic coverage area associated with a DRU, a particular base-station sector or a particular base station. The input may include an indication of one or more well-known bands (e.g., the 800 band, cellular band, PCS band 700 MHz band, 1.49 GHz band, AWS band, BRS/EBS band), bounds on a range, etc. The frequency translations may be identified based on a known baseband frequency band, which will define signals received by the DRU. The frequency translation may be specific to a particular type of communication (e.g., beacon communications, uni-directional communications, communications associated with a particular operator, etc.). This selectivity may be identified by operator input (e.g., specifying that the frequency translation is only to be performed for uni-directional communications involving a DRU) or may be identified by a system (e.g., determining that frequency-band selections entered by a particular operator would not affect frequency translations of communications associated with other operators).

At 1010, the end-path DRU is configured. For example, the DRU may receive information about the one or more frequency translations identified at 1005. The DRU may activate select physical nodes and/or adjust frequency translations occurring with select physical nodes (e.g., by adjusting reference signals contributing to mixing).

At 1015, a beacon signal is received (e.g., via an RF cable) from a base station at a DAU (e.g., directly coupled to the base station). At 1020, the beacon signal is converted from a base-station frequency band to a baseband frequency band. The downlink signal may be further processed (e.g., to convert it to an optical signal). At 1025, the signal is transmitted (e.g., via an optical fiber) to an end-path DRU (e.g., a DRU coupled to an antenna that will transmit the signal to a user device). The transmission may involve transmitting the signal through one or more intermediate DAUs and/or one or more intermediate DRUs. At 1030, the signal is converted from the baseband frequency band to a field frequency band. The conversion (and thus the field frequency band) may depend upon the configuration of the DRU performed at 1010. The signal may be further processed (e.g., to convert it from an optical signal). At 1035, the signal is transmitted (e.g., via an RF cable) to an antenna, which may then transmit the signal to a user device.

In some embodiments, signals are transmitted and received at a plurality of frequency bands, even if, e.g., the signals are associated with a same BTS, sector or operator. For example, an antenna coupled to a single DRU may transmit different beacons (e.g., originating at a same sector) within different frequency bands (e.g., the cellular band and the PCS band). This may allow user devices scanning for signals within each range to detect the beacons. The beacons may communicate which frequency bands would support transmission of uplink and downlink signals to and from the user device. As another example, an antenna coupled to a single DRU may transmit at least some beacons in a first frequency band (e.g., the PCS band) and may receive uplink signals and transmit downlink signals in another frequency band (e.g., the PCS band). As another example, one or more frequency bands associated with beacon signals transmitted by an antenna coupled to a first DRU may be different from one or more frequency bands associated with beacon signals transmitted by an antenna coupled to a second DRU, e.g., even if the signals are associated with a same sector or BTS. As another example, one or more frequency bands associated with uplink/downlink signals received/transmitted by an antenna coupled to a first DRU may be different from one or more frequency bands associated with uplink/downlink signals received/transmitted by an antenna coupled to a second DRU, e.g., even if the signals are associated with a same sector or BTS. Further, an operator may be able to dynamically adjust frequency bands for transmitting and/or receiving select types of signals without needing to manipulate any hardware (e.g., instead interacting with a network-connected graphical user interface to identify the virtual adjustment).

It should be appreciated that the specific steps illustrated in FIGS. 7-10 provide particular methods according to an embodiment of the present invention. Other sequences of steps may also be performed according to alternative embodiments. For example, alternative embodiments of the present invention may perform the steps outlined above in a different order. Moreover, the individual steps illustrated in FIGS. 7-10 may include multiple sub-steps that may be performed in various sequences as appropriate to the individual step. Furthermore, additional steps may be added or removed depending on the particular applications. One of ordinary skill in the art would recognize many variations, modifications, and alternatives.

Methods shown in FIGS. 7-10 or elsewhere described may be performed by a variety of devices or components. For example, some processes may be performed solely or partly by one or more DRUs. Some processes may be performed solely or partly by a remote computer, e.g., coupled to one or more DAUs. In some embodiments, shown or described process may be performed by multiple devices or components (e.g., by one or more DAUs, one and one or more DRUs, by a DRU and a remote server, by a DAU and a remote server, etc.).

Figure 11:
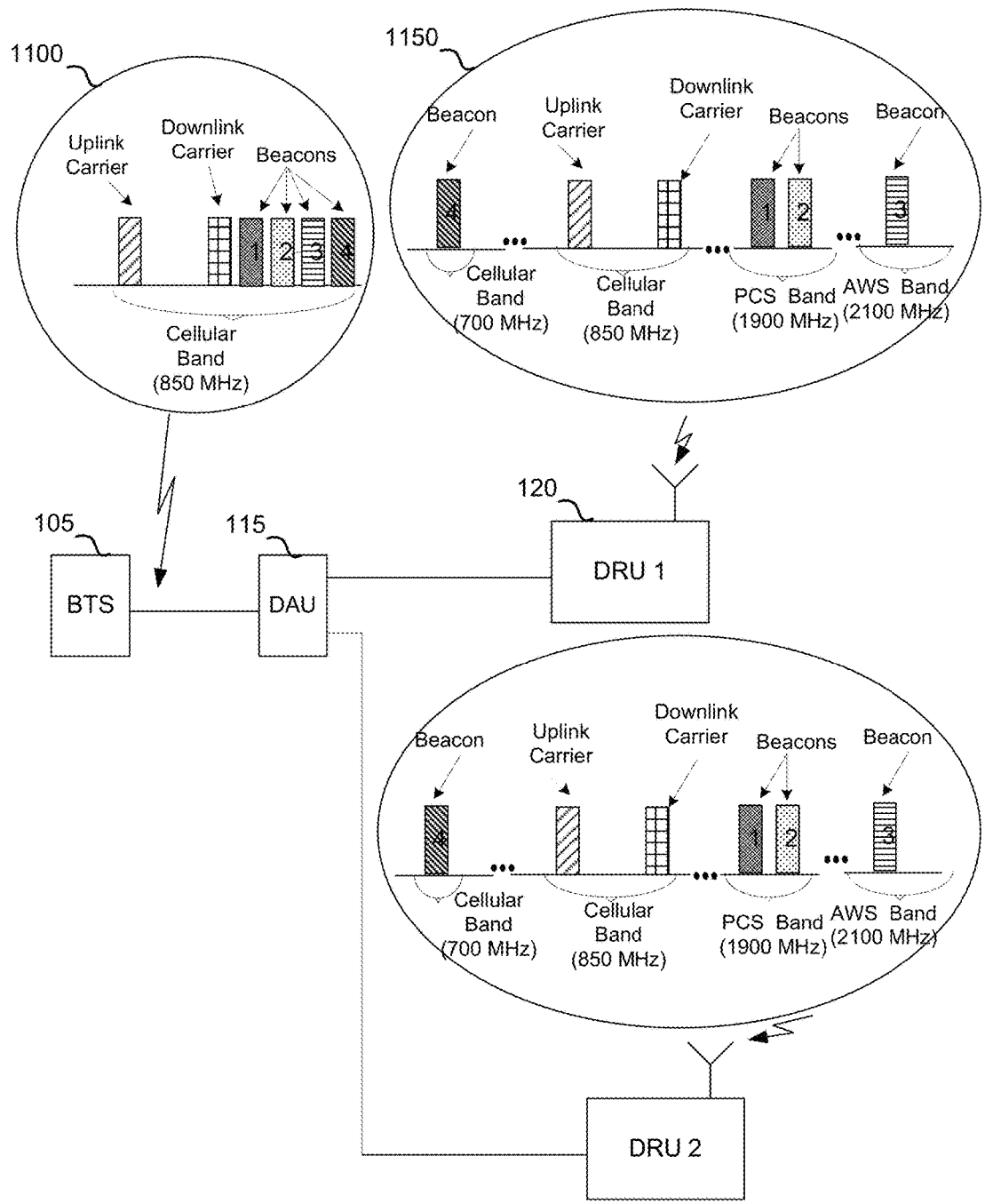
FIG. 11 is a high-level schematic diagram illustrating a wireless network system transmitting signals according to an embodiment of the present invention.

FIG. 11 is a high-level schematic diagram illustrating a wireless network system transmitting signals according to an embodiment of the present invention. For example, the depicted frequency translation may be performed in a Virtualized DAS Network. BTS 105 is connected to DAU 115 (e.g., via an RF cable). BTS 105 operates in a base-station band, which in this instance, is shown as being a Cellular Band at 850 MHz as illustrated by signals 1100. The signals transmitted from BTS 105 include an Uplink and Downlink carrier as well as one or more Beacons. DAU 115 translates the signals to baseband or an intermediate frequency prior to transportation (e.g., over optical fibers) to DRUs 120 (DRU 1 and DRU 2). As described above, the path from BTS 105 to each DRU 120 may include one or more intermediate DAUs 115 and/or one or more intermediate DRUs 120 not shown in FIG. 11.

At DRUs 1 and 2, signals received from DAU 115 are translated from the baseband or intermediate frequency band to one or more frequency bands as illustrated by signals 1150. In the depicted embodiment, the uplink and downlink signals are in a same band as illustrated by signals 1100 and 1150, but at least some Beacons are transitioned between bands. Further, while all beacons in signals 1100 resided within a same band, beacons in signals 1150 reside in different bands. The beacons can be transmitted at whatever desired frequency the operator requests. This provides the DAS infrastructure with the flexibility of repositioning beacons at frequencies different from those in the base-station frequency band, and further allows an operator to transmit beacons originating from a single base-station frequency band in multiple different bands. These features may enable legacy BTS equipment with limited Transceiver Cards to operate in geographical environments where the cellular infrastructure may use multiple carrier frequencies.

An example of a scenario where this functionality can be utilized is when a user enters the geographic space of DRU 120 but the user is communicating in the PCS Band. The Beacons in the PCS band will tell the customers phone to shift the call to the cellular band so that a soft hand-off can be established. This feature is enabled despite the fact that the BTS 105 does not have a Transceiver operating in the PCS Band. The DAS Network has provided this capability by frequency translating the Beacons.

FIG. 12 illustrates a high-level schematic diagram illustrating a wireless network system transmitting signals according to an embodiment of the present invention. The depicted frequency translation may be performed in a Virtualized DAS Network. BTS 105 is connected to a DAU 115 (e.g., via an RF cable). BTS 105 operates in a base-station frequency band, which is depicted as being (for an example) the Cellular Band. Base-station signals 1200 may include an Uplink and Downlink carrier as well as one or more beacons. In some implementations, multiple BTSs can be connected to one DAU, which provides multiple RF inputs suitable for connection to multiple BTSs operating at different frequency bands. An example of such an implementation is illustrated by optional BTS 107, which, in addition to BTS 105, is coupled to DAU 115. The use of multiple BTSs, which can be operated by different operators, enables the signals from multiple operators to be transported by the systems described herein.

DAU 115 translates the signals from the base-station frequency band to a baseband frequency band and transmits the signals (e.g., over an optical fiber) to one or more DRUs 120. As described above, the signals may be transmitted through one or more intermediate DAUs and/or one or more intermediate DRUs before arriving at destination DRU 1 or DRU 2. Each DRU 120 may translate the received signals from the baseband frequency band to one or more field frequency bands. The field-frequency-band signals may then be transmitted via an antenna to user devices.

As in FIG. 11, the DRU-translated signals 1250 include multiple beacons in different frequency bands as compared to their initial base-station frequency band. Further, in this illustration, uplink and downlink signals are also translated into a frequency band (the PCS band) different than the base-station frequency band (the cellular band). Thus, an operator may use legacy BTS equipment with limited Transceiver Cards and may functionally operate in variety of frequency bands outside the limits of the Transceiver Cards. This functionality may be utilized, e.g., when a customer enters the geographic space of DRU1 and the customer is communicating in the PCS Band. The customer can be easily handed-off to BTS 105 since it is virtualized as a PCS BTS. This feature is enabled despite the fact that the BTS 105 does not have a Transceiver operating in the PCS Band. The DAS Network has provided this capability by frequency translating the Traffic Channels and Beacons.

FIGS. 11-12 show embodiments in which the same translations are performed at DRU 1 and DRU 2. In other embodiments, different translations may be performed at different DRUs.

Referring to FIG. 12, in an embodiment, a three-sector Cellular BTS may be virtualized as a three-channel Cellular BTS. The DAS Network facilitates the virtualization of the BTS 105 using independent frequency translation of the sectored Carriers. This feature can be extended to a larger order sectored BTS. The sectors have independent Transceiver cards but operate at the same carrier frequency. Traditionally BTS 105 would have geographically separated the Sectors using directional antennas. In an embodiment, the DAS Network virtualizes the BTS by frequency translating the individual sectors onto distinct carrier frequencies as illustrated.

As described herein, embodiments enable the use of legacy base stations operating at a first frequency by translating the first frequency to a second frequency suitable for communication through equipment operating at the second frequency. As illustrated in FIG. 12, legacy BTS 105 is operating in the cellular band at 850 MHz, only providing RF outputs in this band. As new frequencies have been made available for communications traffic, it is desirable to utilize the legacy BTS, but to communicate in bands other than the cellular band at 850 MHz. BTS 105 is transmitting both uplink and downlink carriers in the 850 MHz band as well as beacons 1-4 in this same band. DRU 1 120 is transmitting uplink and downlink carriers in the 1900 PCS band as illustrated by translated signals 1250. In order to notify mobile devices in the vicinity of DRU 1 that DRU 1 is operating at 1900 MHz, beacons 4, 1-2, and 3 are provided in the cellular band at 750 MHZ, the cellular band at 850 MHz, and the AWS band at 2100 MHz, respectively. Accordingly, mobile devices operating in these bands on adjacent BTSs or DRUs can utilize the beacons to determine that a transfer should be made to operating at 1900 MHz in communication with DRU 1. Beacons can also be provided in the transmission band (e.g., 1900 MHz).

Thus, as illustrated in FIG. 12, DAU 115 and DRU 1 120 are utilized to perform frequency translation to the second frequency (i.e., the PCS band at 1900 MHz) and to place beacons in the various bands as appropriate. As illustrated, the uplink carrier and the downlink carriers are frequency translated as well as the beacons. It should be noted that although FIG. 12 illustrates DRU 1 as operating at a single translated frequency (i.e., the PCS band at 1900 MHz), this single frequency operation is not required by embodiments of the present invention. Rather, DRU 1 could be in communication with additional BTSs through DAU 115, enabling operation at additional bands (e.g., up to or more than 4 bands).

Embodiments described herein may provide a high degree of flexibility to manage, control, enhance and facilitate radio resource efficiency, usage and overall performance of the distributed wireless network. This advanced system architecture enables specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier and beacon placement, traffic monitoring, and/or traffic tagging. Embodiments of the present invention can also serve multiple operators, multi-mode radios (modulation-independent) and multiple frequency bands per operator to increase the efficiency and traffic capacity of the operators' wireless networks.

Figure 13:
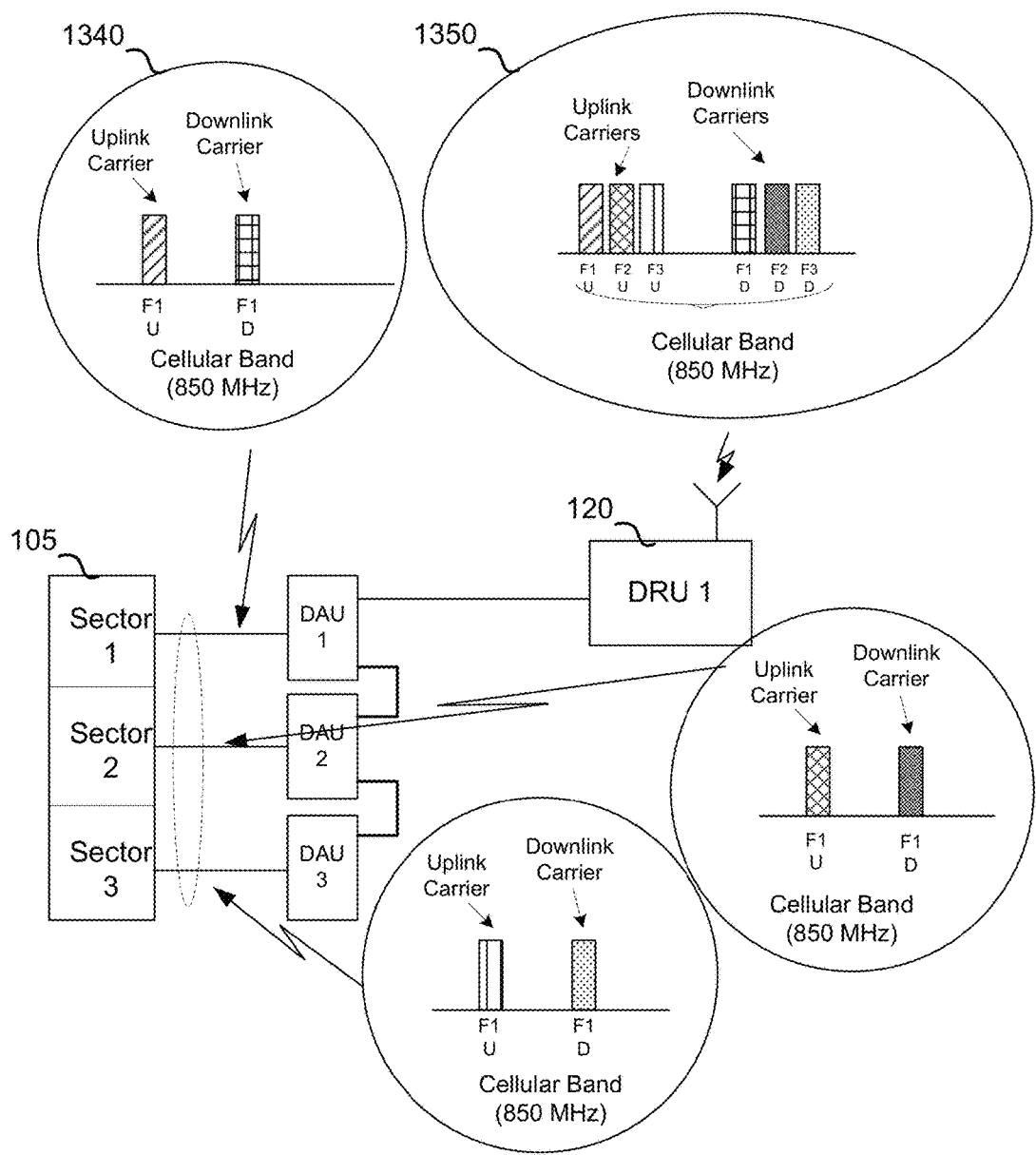
FIG. 13 is a high-level schematic diagram illustrating a wireless network system transmitting signals according to an embodiment of the present invention.

FIG. 13 is a high-level schematic diagram illustrating a wireless network system transmitting signals according to an embodiment of the present invention. As illustrated in FIG. 13, a three sector base station 105 is used with three sectors that transmit at the same frequency (i.e., 850 MHz) as illustrated by signals 1340. All sectors operate in the same frequency band, but include different content. By converting the frequencies of the signals from the sectors using the DAUs (e.g., DAU1), the carrier frequencies of the signals transmitted by DRU 1 120 can be translated to different frequencies. As illustrated by signals 1350, three downlink carriers F1, F2, and F3 are transmitted from DRU1 in the 850 MHz cellular band, whereas a single uplink carrier at F1 was transmitted by sectors 1-3. Similar frequency translations for the uplink carriers (e.g., F1, F2, and F3 translated to F1) can be performed. In some implementations, digital signal processing in the FPGA of the DRU could be used to perform the illustrated frequency translation rather than by varying the oscillators in the DRU.

Figure 14:
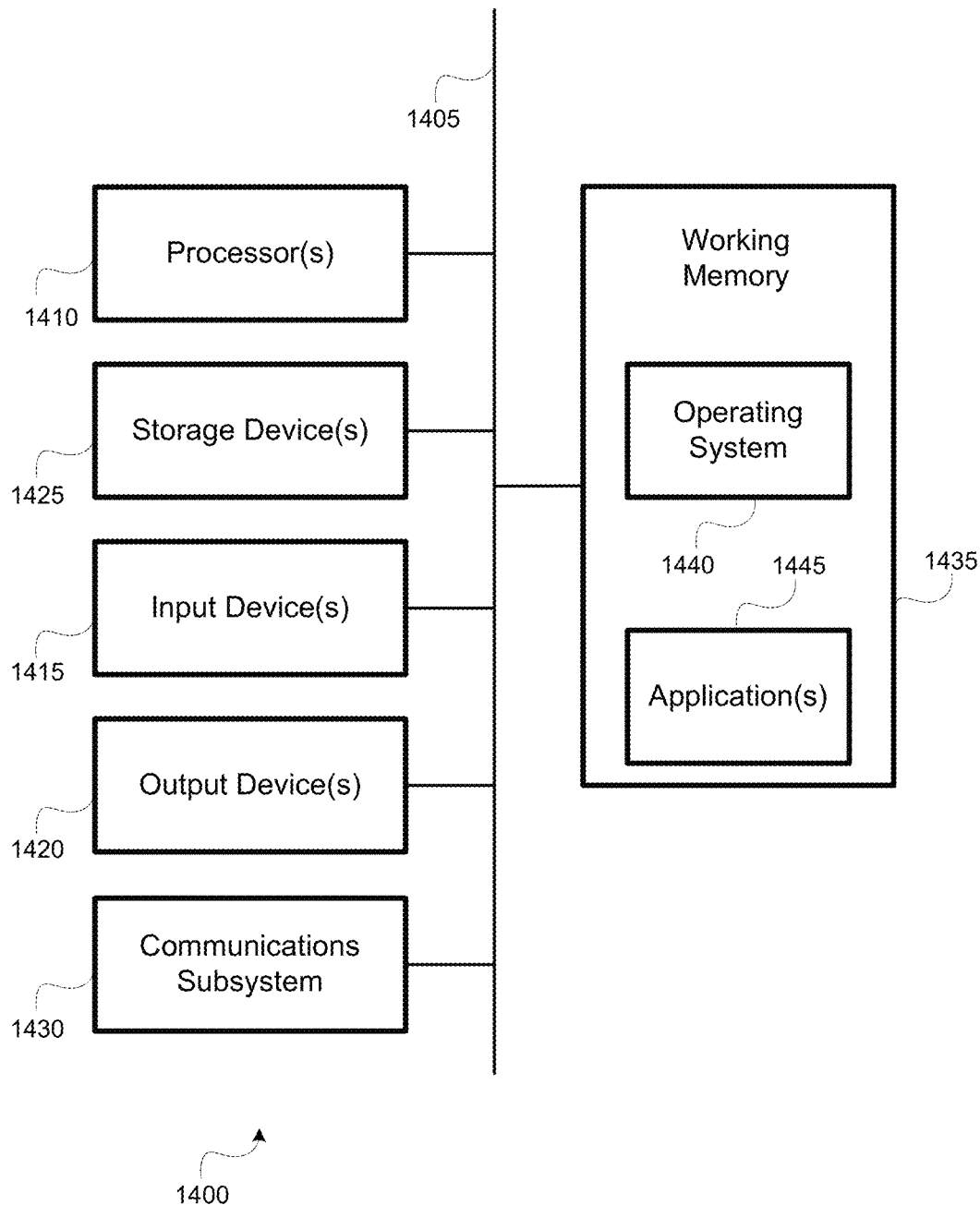
FIG. 14 is a high-level schematic diagram illustrating a computer system according to an embodiment of the present invention.

FIG. 14 is a high level schematic diagram illustrating a computer system 1400 including instructions to perform any one or more of the methodologies described herein. One or more of the above-described components (e.g., DAU 115, DRU 120, server 130, server 525, computer 620, etc.) may include part or all of computer system 1400. System 1400 may also perform all or part of one or more methods described herein. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which can include without limitation a mouse, a keyboard and/or the like; and one or more output devices 1420, which can include without limitation a display device, a printer and/or the like.

The computer system 1400 may further include (and/or be in communication with) one or more storage devices 1425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communications subsystem 1430, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1430 may permit data to be exchanged with a network (such as the network described below, to name one example), other computer systems, and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computer system, such as the system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1400) to perform methods in accordance with various embodiments of the invention. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 1400, various computer-readable media might be involved in providing instructions/code to processor(s) 1410 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1425. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

Figure 15:
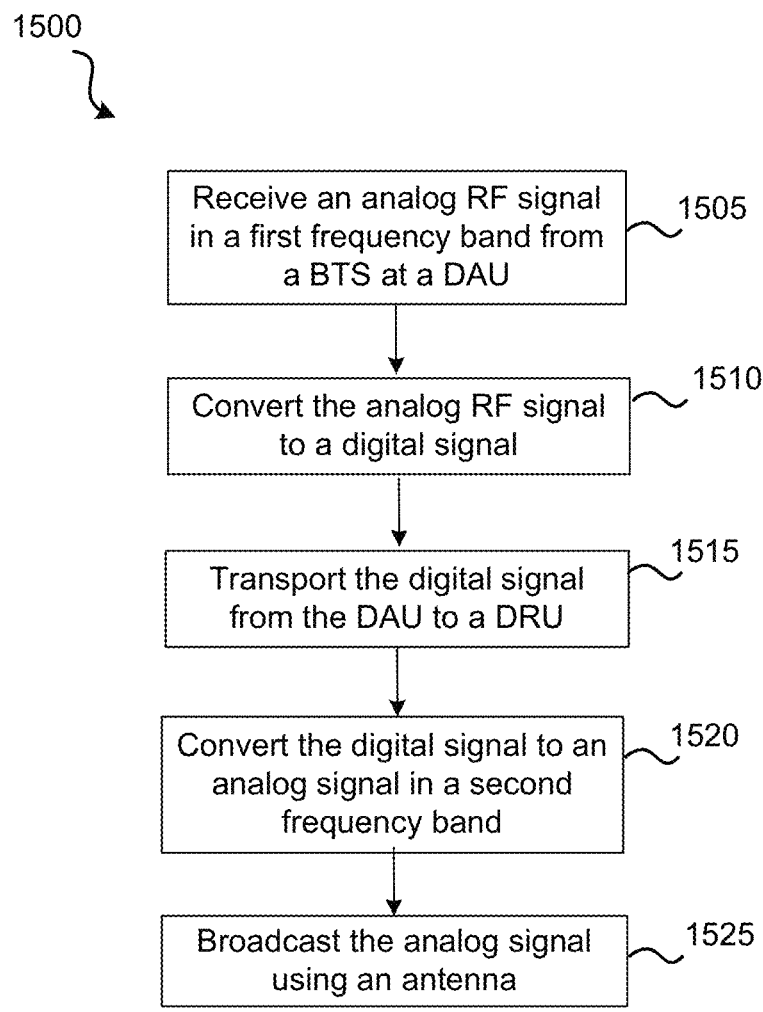
FIG. 15 is a simplified flowchart illustrating a method of communicating with a wireless user device according to an embodiment of the present invention.

FIG. 15 is a simplified flowchart illustrating a method of communicating with a wireless user device according to an embodiment of the present invention. The method 1500 includes receiving an analog RF signal from a BTS at a DAU (1505). The analog RF signal includes a downlink carrier associated with a first frequency band. As an example, the first frequency band could be a cellular band at 850 MHz, which is the frequency band at which the BTS operates. In other embodiments, the BTS could operate in another frequency band, for example, 700 MHz, 900 MHz, 1900 MHz, or the like.

The method also includes converting the analog RF signal to a digital signal using one or more elements of the DAU (1510). The digital signal is then transported, for example, over a fiber connection, to a DRU (1515). The digital signal is converted to an analog signal and frequency converted to a second frequency band (1520). The downlink signal, now at the second frequency band (i.e., the analog signal in the second frequency band), is broadcast using an antenna coupled to the DRU (1525). Uplink signals follow an analogous path in the upstream direction.

In some embodiments, the beacons that were present in the first frequency band received from the BTS are frequency translated into other frequency bands, which can be different from the second frequency band.

It should be appreciated that the specific steps illustrated in FIG. 15 provide a particular method of communicating with a wireless user device according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

According to an embodiment of the present invention, a method for communicating with wireless user devices is provided. The method includes receiving an input from an operator identifying a field frequency band and virtually configuring a DRU to convert signals to the field frequency band. As an example, virtually configuring the DRU can include identifying physical nodes of the DRU to process signals. Additionally, the input may also include a type of signal to be converted. Moreover, the input can indicate a particular DRU, of a plurality of DRUs, that is to be virtually configured.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for communicating with wireless user devices, the system comprising:
    a Digital Access Unit (DAU) operable to be coupled to a base transceiver station (BTS) comprising at least one sector configured to transmit radio-frequency (RF) signals within a first frequency band, wherein the DAU is configured to:
  receive at least some of the RF signals output by the BTS;
  process the at least some of the RF signals; and
  transmit the processed signals; and
at least one Digital Remote Unit (DRU) configured to:
  receive the processed signals, wherein each processed signal comprises at least a first processed signal portion and a second processed signal portion; and
  translate the first processed signal portion to a second frequency band and the second processed signal portion to a third frequency band, wherein the second frequency band and the third frequency band are different than the first frequency band.

2. The system of claim 1 wherein the at least one of the processed signals comprises a beacon signal.

3. The system of claim 1 wherein the at least one of the processed signals comprises a downlink signal.

4. The system of claim 1 wherein the at least one DRU is further configured to translate at least yet another of the processed signals to the first frequency band.

5. The system of claim 4 wherein each of the at least one of the processed signals and the at least another of the processed signals comprises a beacon signal.

6. The system of claim 4 wherein the at least one of the processed signals comprises a beacon signal and the at least another of the processed signals comprises a downlink signal.

7. The system of claim 1 wherein processing the at least some of the RF signals comprises converting the at least some of the RF signals to optical signals.

8. The system of claim 1 wherein the first frequency band comprises the Cellular Band and wherein the second frequency band comprises the PCS band.

9. The system of claim 1 wherein the BTS lacks hardware required to transmit signals within the second frequency band and the third frequency band.

10. The system of claim 1 wherein the at least one DRU comprises a first DRU and a second DRU, and wherein:
  the first DRU is configured to:
    receive a first subset of the processed signals; and
    translate at least one of the first subset of processed signals to the second frequency band; and
  the second DRU is configured to:
    receive a second subset of the processed signals; and
    translate at least one of the second subset of processed signals to the third frequency band.

11. A method for communicating with wireless user devices, the method comprising:
  receiving a first signal at a Digital Access Unit (DAU), the first signal residing within a first frequency band;
  processing the first signal at the DAU;
  transmitting the processed first signal from the DAU;
  receiving the transmitted first signal at a Digital Remote Unit (DRU), wherein the transmitted first signal comprises at least a first signal portion and a second signal portion; and
  converting the first signal portion to a second frequency band and the second signal portion to a third frequency band, wherein the second frequency band and third frequency band are different than the first frequency band.

12. The method of claim 11 wherein the first signal comprises a beacon signal.

13. The method of claim 11 wherein the first signal comprises a downlink signal.

14. The method of claim 11 further comprising:
  receiving a second signal at the DAU, the second signal residing within the first frequency band;
  processing the second signal at the DAU;
  transmitting the processed second signal from the DAU;
  receiving the transmitted second signal at the DRU; and
  converting the second signal to the first frequency band.

15. The method of claim 14 wherein each of the first signal and the second signal comprises a beacon signal.

16. The method of claim 14 wherein the first signal comprises a beacon signal and the second signal comprises a downlink signal.

17. The method of claim 14 wherein each of the first signal and the second signal are received from a same base transceiver station (BTS.

18. A method for communicating with wireless user devices, the method comprising:
  receiving a plurality of beacon signals comprising a first portion of beacon signals and a second portion of beacon signals, each of the plurality of beacon signals having originated at a base transceiver station (BTS) and having been transmitted by the BTS within a first radio frequency (RF) frequency band; and
  translating the first portion of beacon signals to at least a second RF frequency band and the second portion of beacon signals to a third RF frequency band, wherein the second RF frequency band and the third RF frequency band are different from the first RF frequency band.

19. The method of claim 18 wherein the one or more first RF frequency band does not overlap with the second RF frequency band and the third RF frequency band.

20. The method of claim 18 wherein a total frequency span of each of the second RF frequency band and third RF frequency band is greater than a total frequency span of the first RF frequency band.

21. A system for communicating with wireless user devices, the system comprising:
  a Digital Access Unit (DAU) operable to receive at least one radio frequency (RF) signal from a base station, wherein the at least one RF signal is associated with a first frequency band and the DAU includes:
    an RF input;
    a first mixer coupled to the RF input;
    a first oscillator coupled to the first mixer and operable to convert signals in the first frequency band to an intermediate frequency, wherein each signal includes at least a first signal portion and a second signal portion;
    an analog-to-digital (A/D) converter coupled to the mixer; and
    a first field programmable gate array (FPGA) coupled to the A/D converter;
  a Digital Remote Unit (DRU) coupled to the DAU, wherein the DRU includes:
    a second FPGA;
    a digital-to-analog (D/A) converter coupled to the second FPGA;
    a second mixer coupled to the D/A converter and operable to convert the first signal portion at the intermediate frequency to a second frequency band and the second signal portion at the intermediate frequency to a third frequency band, wherein the second frequency band and third frequency band are different from the first frequency band; and an RF output coupled to the second mixer; and
an antenna coupled to the DRU.

22. The system of claim 21 wherein the first frequency band comprises a Cellular Band and the second frequency band comprises a PCS band.

23. The system of claim 22 wherein the Cellular Band is at 850 MHz and the PCS band is at 1900 MHz.

24. The system of claim 21 wherein DRU is coupled to the DAU through an optical fiber connection.

25. The system of claim 1 wherein the at least one DRU is coupled to the DAU via an optical fiber.

* * * * *

UNITED STATES PATENT AND TRADEMARK OFFICE
CERTIFICATE OF CORRECTION

PATENT NO. : 9,723,612 B2
APPLICATION NO. : 13/753288
DATED : August 1, 2017
INVENTOR(S) : Shawn Patrick Stapleton and Daryl Meerkerk Page 1 of 1

It is certified that error appears in the above-identified patent and that said Letters Patent is hereby corrected as shown below:

On the Title Page

Item (72), Delete "Daryl Meerkeerk" and insert --Daryl Meerkerk--.

Signed and Sealed this
Tenth Day of April, 2018

Andrei Iancu
*Director of the United States Patent and Trademark Office*